US012755603B2

(12) United States Patent
Rye et al.

(10) Patent No.: US 12,755,603 B2
(45) Date of Patent: Oct. 6, 2026

(54) GAMING MACHINE CABINET AND METHOD FOR ASSEMBLING GAMING MACHINE CABINET

(71) Applicant: AGS LLC, Las Vegas, NV (US)

(72) Inventors: Ryan Patrick Rye, Suwanee, GA (US); Matt Rodgers, Cumming, GA (US); Ely Tillery, Tucker, GA (US)

(73) Assignee: AGS LLC, Las Vegas, NV (US)

( * ) Notice: Subject to any disclaimer, the term of this patent is extended or adjusted under 35 U.S.C. 154(b) by 205 days.

(21) Appl. No.: 18/786,974

(22) Filed: Jul. 29, 2024

(65) Prior Publication Data

US 2026/0030950 A1 Jan. 29, 2026

(51) Int. Cl.
*G07F 17/32* (2006.01)

(52) U.S. Cl.
CPC ................................ *G07F 17/3216* (2013.01)

(58) Field of Classification Search
CPC ............ G07F 17/3211; G07F 17/3216; F16M 11/041; F16M 11/18; F16M 11/24; F16M 11/26; F16M 11/38; A47B 9/20; G06F 1/1601
See application file for complete search history.

(56) References Cited

U.S. PATENT DOCUMENTS

| | | | |
|---|---|---|---|
| 10,506,730 B2 | 12/2019 | Wand et al. | |
| 10,521,998 B2 | 12/2019 | Barbour et al. | |
| 10,573,118 B2 | 2/2020 | Goldstein et al. | |
| 10,713,880 B2 | 7/2020 | Taylor et al. | |
| 11,823,526 B2 | 11/2023 | Fritz et al. | |
| 2019/0039867 A1 | 2/2019 | Urban et al. | |
| 2019/0320543 A1 | 10/2019 | Wand et al. | |
| 2022/0092915 A1 | 3/2022 | Barbour et al. | |
| 2022/0092922 A1 | 3/2022 | Barbour et al. | |
| 2022/0180695 A1 | 6/2022 | Fritz et al. | |
| 2025/0322711 A1* | 10/2025 | Rodd | G07F 17/3216 |

* cited by examiner

*Primary Examiner* — Lawrence S Galka
(74) *Attorney, Agent, or Firm* — Endurance Law Group PLC; James R. Yee

(57) ABSTRACT

A gaming machine cabinet for a gaming machine has a shipping configuration and an assembled configuration and includes a base cabinet, a tower assembly, a monitor assembly, a biasing mechanism, and a removable brace device. The tower assembly is coupled to an upper end of the base cabinet and extends upward therefrom. The monitor assembly is moveable between a shipping position and an intermediate position and between the intermediate position and a closed position. A first end of the removable brace device is connected to the upper tower and a second end of the removable brace device is connected to the monitor assembly when the removable brace device is in the shipping state.

29 Claims, 30 Drawing Sheets

GAMING MACHINE CABINET AND METHOD FOR ASSEMBLING GAMING MACHINE CABINET

FIELD OF THE INVENTION

The invention relates generally to gaming machine cabinets, and more particularly to a gaming machine cabinet having a monitor assembly moveably between a shipping configuration and an assembled configuration and a method for assembling a gaming machine cabinet having a shipping configuration and an assembled configuration.

BACKGROUND OF THE INVENTION

Wager-based gaming machines have become increasingly complex. Originally, mechanical slot machines had metal cabinets which housed a plurality of spinning physical reels which displayed game symbols. The symbols were viewable through windows in a front of the gaming machine.

Gaming machines continue to evolve, both relative to their method of manufacture and their aesthetic appearance. For example, gaming machines are often modular now and may include a main unit with an upper unit. The main unit may include the components necessary for operation of the gaming machine, including, for example but not limited to, a controller and user input devices.

Mechanical reels may be replaced with video displays to simulate mechanical reels or to provide a video slot game. Further, other types of games may be provided on the video display or displays. One or more video displays may be provided on a single gaming machine. Generally, the size of such gaming machines and/or their associated video displays is increasing. This may present a problem which shipping and/or assembling such machines on a gaming floor.

For instance, the overall height of the gaming machine when assembled may exceed the size of standard shipping containers. Further, such displays (and/or an assembly including one or more displays) may be relatively heavy, making the assembly process more difficult, time consuming and/or requiring more than one person. Some prior art gaming cabinets are shipped or transported in a disassembled state. This may result in lost or mis-shipped components. Further, shipping components separately may require import/export coordination without which import/export issues may arise.

The present invention is aimed at one or more of the problems identified above.

BRIEF SUMMARY OF THE INVENTION

In a first aspect of the present invention, a gaming machine cabinet having a shipping configuration and an assembled configuration is provided. The gaming machine cabinet includes a base cabinet, a tower assembly, a monitor assembly, a biasing mechanism, and a removable brace. The base cabinet has an upper end, a bottom end, and a front side. The tower assembly is coupled to the upper end of the base cabinet and extends upward therefrom. The monitor assembly is moveably coupled to the tower assembly and moveable between a shipping position and a closed position. The biasing mechanism is rotatably coupled between the tower assembly and the monitor assembly. The removable brace device is connected to the tower assembly and the monitor assembly when the removable brace is in a shipping state and the monitor assembly is in the shipping position. The gaming machine cabinet is in the shipping configuration when the monitor assembly is in the shipping position and the removable brace device is in the shipping state. The gaming machine cabinet is in the assembled configuration when the removable brace device is removed, and the monitor assembly is in the closed position. The monitor assembly is moveable from the shipping position when the removable brace device is removed.

In a second aspect of the present invention, an assembly process for a gaming machine cabinet having a shipping configuration and an assembled configuration and including a base cabinet, a tower assembly, a monitor assembly, a biasing mechanism and a removable brace device is provided. The base cabinet has an upper end, a bottom end, and a front side. The tower assembly is coupled to the upper end of the base cabinet and extends upward therefrom. The monitor assembly is moveably coupled to the tower assembly. The monitor assembly is moveable between a shipping position and a closed position. The biasing mechanism is rotatably coupled between the tower assembly and the monitor assembly. The removable brace device has a shipping state and a removed state and is connected to the tower assembly and configured to support the monitor assembly when the removable brace is in the shipping state and the monitor assembly is in the shipping position. The gaming machine is in the assembled configuration when the monitor assembly is in the closed position. The monitor assembly is moveable from the shipping position when the removable brace device is in the removed state. The method includes the steps of:

- with the gaming machine cabinet in the shipping configuration and the monitor assembly in the shipping position, removing the removable brace device from the shipping position;
- moving the monitor assembly from the shipping position; and, rotating the monitor assembly relative to the tower assembly position to the closed position.

BRIEF DESCRIPTION OF THE SEVERAL VIEWS OF DRAWINGS

These and other features and advantages of the present invention will become more readily appreciated when considered in connection with the following detailed description and appended drawings.

DETAILED DESCRIPTION OF THE INVENTION

With reference to the figures, and in operation, the present invention provides a gaming machine 10 having a gaming machine cabinet 12. In the illustrated embodiment, the gaming machine 10 is a video gaming machine that may be utilized in providing one or more base games, such as video slot games, and/or bonus games to a player. However, it should be noted that the gaming machine 10 may be configured to provide other types of games. The gaming machine cabinet 12 generally includes a frame which may be comprised of different framing members (not shown) and/or may be at least partially comprised of other components of the gaming machine 10. In general, the term "frame" may refer to components of the gaming machine cabinet 12 to which other components are fastened, mounted, or otherwise connected thereto.

As discussed in more detail below, the gaming machine cabinet 12 is configurable or adjustable between a shipping configuration (see for example, FIGS. 2A, 3A, 5A) and an assembled (or closed) configuration (see for example, FIGS. 1A-1B). As discussed in more detail below, the gaming machine cabinet 12 of the present invention allows a monitor assembly 20 (including one or more monitors) to be preinstalled on the gaming machine cabinet 12 such that the monitor assembly 20 is installed during shipping. The monitor assembly 20 (and/or monitors) may be preinstalled on the gaming machine cabinet 12 and shipped therewith.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The principles of the invention may be applied to gaming machines having various configurations. The gaming machine may be located at a casino (and as such may be referred to as a "casino gaming machine"). As described below, the gaming machine may be part of a gaming system, such as a casino gaming system which links two or more of the gaming machines or one or more gaming machines with other devices, such as one or more table games, kiosks, accounting systems or servers, progressive systems or servers, player tracking systems or servers or the like.

General Operation

Figure 1A:
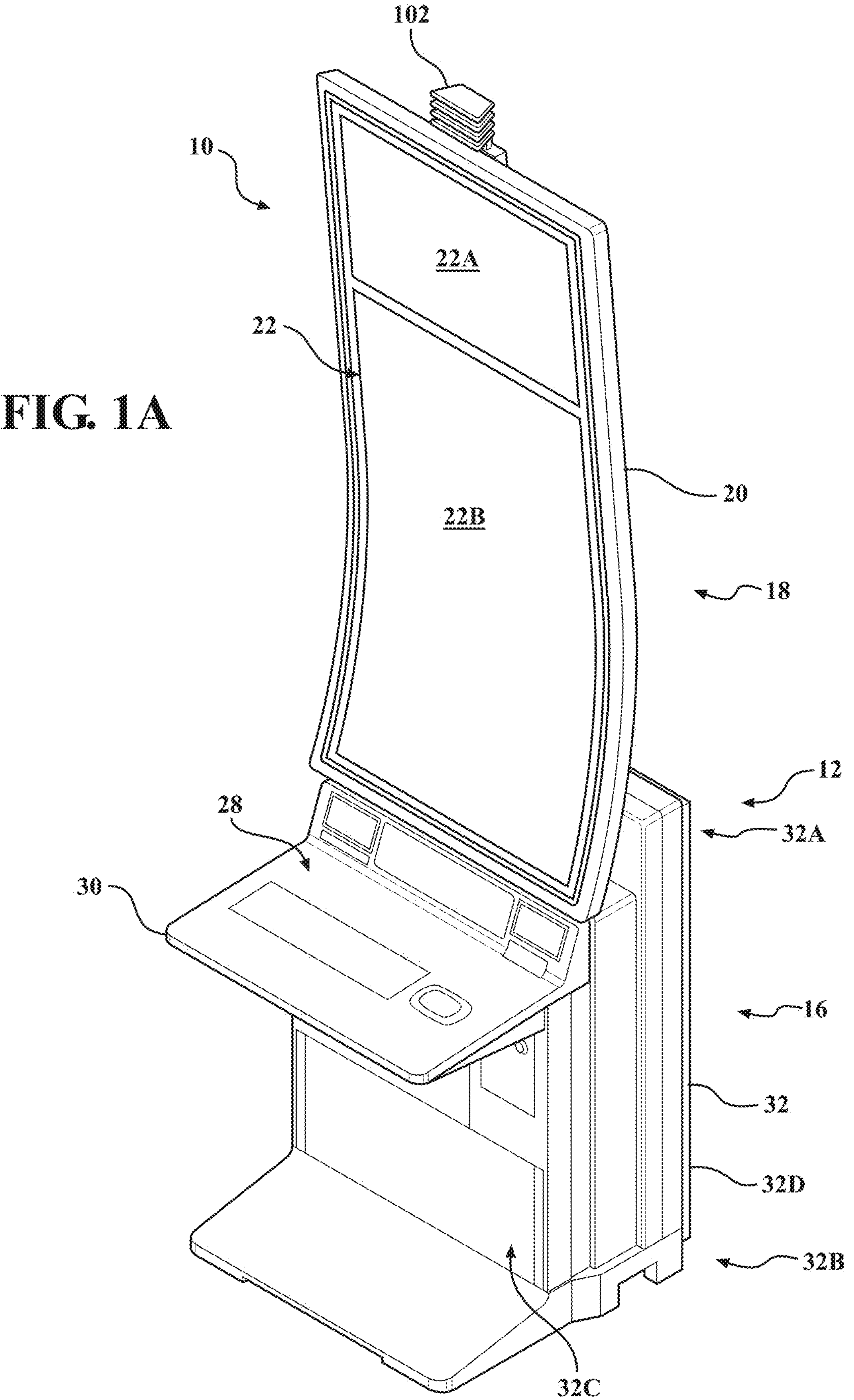
FIG. 1A is a perspective view of a gaming machine cabinet having a main unit, an upper unit, and a monitor assembly.

One configuration of a gaming machine 10 to which aspects of the invention may be applied is illustrated in FIG. 1A. As illustrated, the gaming machine 10 generally includes the gaming machine cabinet (or housing) 12 for supporting and/or enclosing various components required for operation of the gaming machine. The gaming machine cabinet 12 may include one or more doors (not shown) or other access panels or features which can be moved between an open position which allows access to one or more interior portions of the gaming machine, and a closed position in which access to the one or more interior portions is generally prevented. The door(s) may include locks or other features for securing them in their closed positions. The configuration of the gaming machine 12 may vary, such as having other shapes or dimensions.

With reference to FIG. 1, the illustrated gaming machine cabinet 12 includes a main or main unit 16 and an upper unit 18. Generally, in the illustrated embodiment, the main unit 16 houses various components of the gaming machine 10 in an internal cavity (not shown).

The upper unit 18 may house or include a monitor assembly 20 to display game information. The monitor assembly 20 may include one or more display devices (or monitors) 22. In the illustrated embodiment, the monitor assembly 20 includes a first display device 22A and a second display device 22B mounted adjacent in the monitor assembly 20. In one embodiment, the second display device 22B acts as the main display device of the gaming machine 10, while the first display device 22A acts as a topper unit for displaying other game related information. In one embodiment, the second display device 22B may be a 49" curved or flat display device and the first display device 22A may be a 27" display device. In another embodiment, the monitor assembly 20 may include a single display device 22. For example, in one embodiment the monitor assembly 20 may include a 75" curved display. In another embodiment, monitor assembly 20 may include edge lighting components or systems (not shown).

Each display device 22, 22A, 22B may comprise an electronic video display as a high resolution flat panel liquid crystal display (LCD), projection LCD, plasma display, field emission display, digital micro-mirror display (DMD), digital light processing display (DLP), LCD touchscreen, a light emitting display (LED), and organic light emitting display (OLED), or other suitable displays now known or later developed, in a variety of resolutions, sizes and formats. The display devices 22, 22A, 22B may be capable of projecting or displaying a wide variety of information, including images, symbols and other indicia or information associated with game play, game promotion or other events.

In general, the gaming machine 10 may be configured to present one or more games upon a player making a monetary payment or wager. In this regard, the gaming machine 10 may include a mechanism or means for accepting monetary value, such as a bill validator or a ticket reader, or may be configured to accept a wireless transfer of a monetary payment or wager. In one embodiment, certain game outcomes (but preferably not all game outcomes) may be designated as winning outcomes (the non-winning outcomes may be referred to as losing outcomes). Prizes or awards may be provided for winning outcomes, such as monetary payments (or representations thereof, such as prize of credits), or promotional awards as detailed herein. The gaming machine 10 may include a mechanism or means for returning unused monetary funds and/or dispensing winnings to a player.

Figure 1B:
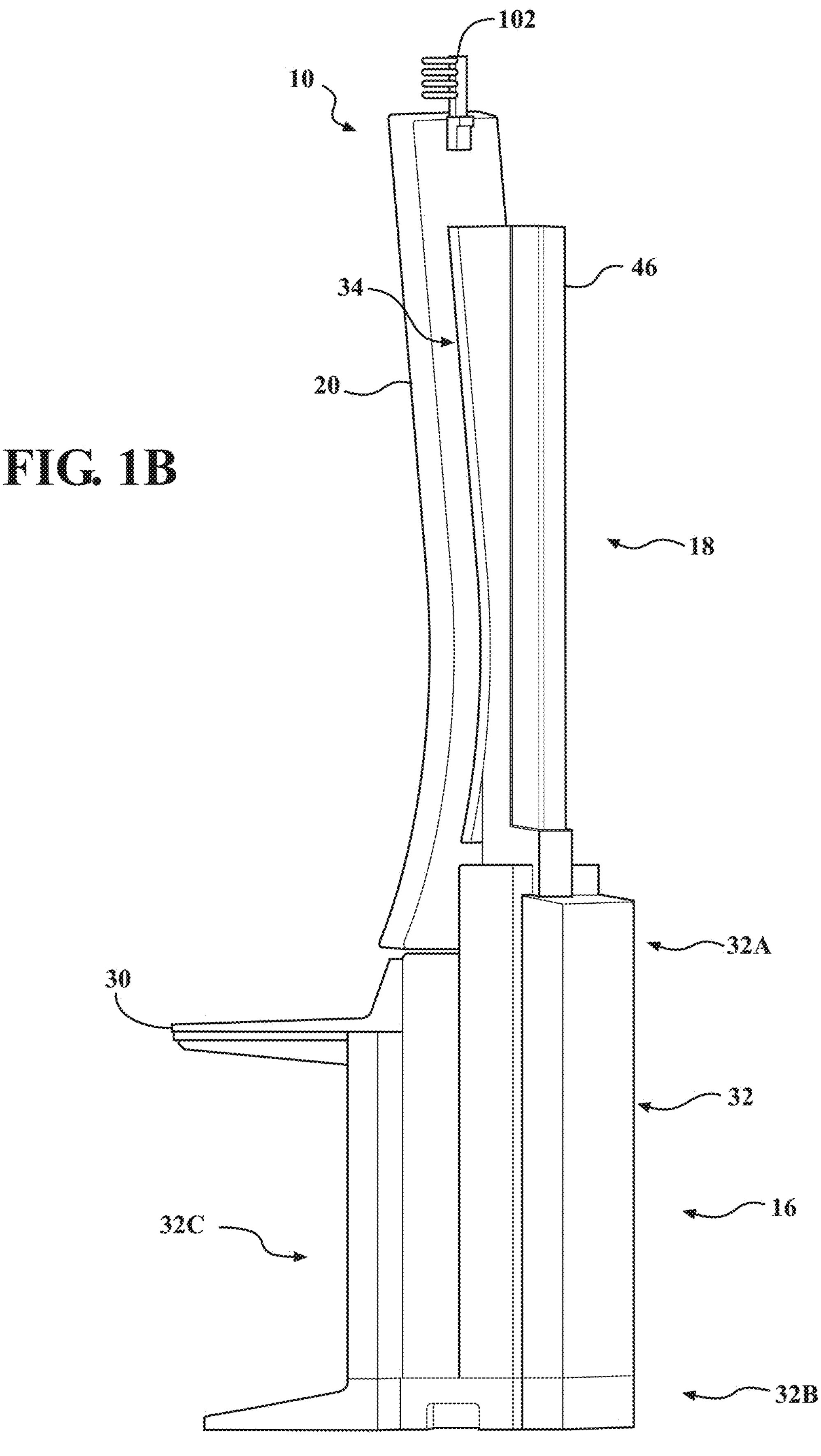
FIG. 1B is a second perspective view of the gaming machine cabinet of FIG. 1A.

With reference to FIGS. 1A and 1B, the gaming machine 10 preferably includes one or more player input devices 28 (such as input buttons, plunger mechanisms, a touch-screen display, joystick, touch-pad, or the like). These one or more input devices 28 may be utilized by the player to facilitate game play, such as by providing input or instruction to the gaming machine 10. For example, such input devices 28 may be utilized by a player to place a wager, cause the gaming machine 10 to initiate a game, to "cash out" of the gaming machine, or to provide various other inputs. As illustrated, a button deck or panel 30 may extend outwardly from the front or face of the gaming machine cabinet 12 towards the player. In the illustrated embodiment, the button deck 30 is coupled to the front side 32C of the base cabinet 32 and extends therefrom. The button deck 30 may support, for example, the one or more of the input devices 28, such as buttons, a touch screen or the like.

In one embodiment, the gaming machine 10 includes at least one microprocessor or controller (not shown) for controlling the gaming machine 10, including receiving player input and sending output signals for controlling the various components or peripheral devices of the machine 10 (such as controlling game play and generating game information for display by the displays 22, 22B, 22C). The controller may be arranged to receive information regarding funds provided by a player to the gaming machine 10, receive input such as a purchase/bet signal when a purchase/bet button is depressed, and receive other inputs from a player. The controller may be arranged to generate information regarding a game, such as generating game information for determining winning or losing game outcomes and controlling display of game play information and indicia on the display devices 22, 22B, 22C. A removable attendant light assembly 102 extends from the top of the monitor assembly 20. The removable attendant light assembly 102 may be removed for shipping.

In general, the controller may be configured to execute machine readable code or "software" or otherwise process information, such as obtained from a remote server. Software or other instructions may be stored at a memory or data storage device, e.g., in a fixed or non-transitory configuration. The memory may also store other information or data, such as data stored in table(s) or other forms (including, but not limited to look-up tables, pay tables and other information, including tracked game play information). The gaming machine 10 may also include one or more random number generators for generating random numbers (such as implemented by a random number generator software module stored in the memory and executable by the processor or controller), such as for use in selecting game information and presenting the game in a random fashion (e.g. whereby the game is presented in a manner in which the player cannot control the outcome) or non-random fashion (e.g. such as where the game includes a skill component which can affect the outcome of the game).

The controller may be configured to execute machine readable code or instructions (e.g., software) which are configured to implement the game. In this regard, the gaming machine is specially configured to present the game via specific software and/or hardware which causes the gaming machine to operate uniquely. For example, the controller of the gaming machine 12 may be configured to detect a wager, such as a signal from a player's depressing of the "bet one" button (such as one of the buttons 28). Upon such an event and/or the player otherwise signaling the gaming machine to present the game, the controller may be configured to cause game related indicia and information, such as the outcome of a play of a game as a set of game symbols, to be displayed. The controller may accept input from a player of game inputs, such as a request to spin reels or the like, via the one or more player input devices of the gaming machine 10. As indicated above, the machine-readable code may be configured in various manners, such as by having various "modules" of software which are designed to implement specific features of the game play or game presentation.

The gaming machine 10 may be configured to generate and present games in a stand-alone manner or it may be in communication with one or more external devices at one or more times. For example, the gaming machine 10 may be configured as a server based device and obtain game code or game outcome information from a remote game server (in which event the gaming machine controller may receive game information from the server, such as game outcome information, and use that server-generated information to present the game at the gaming machine). For example, the gaming machine 10 might be configured as a stand-alone device or as a server-based device for presenting games as Class III games (as defined by the U.S. Indian Gaming Regulatory Act) or as a server-based device for presenting games as Class II games (as defined by the U.S. Indian Gaming Regulatory Act).

As indicated, the gaming machine 10 is configured to present one or more wagering games. The gaming machine 10 may be configured to accept value, such as in the form of coins, tokens, paper currency, physical indicia of value, or other elements or devices representing value such as monetary funds. Thus, as indicated above, the gaming machine 10 preferably includes a mechanism or means for accepting monetary value. For example, while not shown, the gaming machine 10 might include a coin acceptor for accepting coins. Of course, associated coin reading/verifying devices and coin storage devices may be associated with the gaming machine 10 if it is configured to accept coins. Likewise, the gaming machine 10 might include a currency accepting device having an acceptor slot or opening which is accessible through an access opening, such as in the front of the cabinet just above the button deck 30 As also described below, such a device may be configured to accept and read/verify paper currency and/or other media such as tickets (although the currency accepting device may be configured to accept and read not only currency, but tickets, media or elements other than currency, for case of reference the device is referred to herein as a currency accepting device).

The gaming machine 10 might also be configured to read devices, such as magnetic stripe cards or other media having data associated therewith and via which value or funds may be associated with the gaming machine 10. The mechanism for accepting monetary value might also comprise hardware and/or software which allows a player to transfer (such as electronically) funds from an account, such as a casino wagering account, or a bank or other financial institution account. Such a mechanism might include a communication interface which permits the gaming machine to communicate with a mobile phone, PDA, tablet or other electronic device of the player (such as via a physical interface or wired or wireless communications links, such as to enable the transfer of funds from the player to the gaming machine or system).

When the player associates funds with the gaming machine 10 or an associated system, a credit balance is generated. The credit balance may comprise a plurality of monetary value credits. The player may wager some or all of the associated monetary value, such as by wagering one or more of the credits associated with the credit balance. For example, the player might provide input to a wager button or touch screen interface to wager a certain number of credits (such as “Bet 1 Credit”, “Bet 5 Credits”, “Bet Maximum Credits” or other options). In one embodiment, when the player’s wager is received, the player’s credit balance is reduced by the number of wagered credits. The player might then provide a separate input to begin the game. In other embodiment, the player might select a “play game” input, such as by pressing a “spin” button, which input is taken to comprise both an instruction to place a wager (such as of a pre-set or pre-selected number of credits) and to start the game. Of course, other configurations may be implemented for accepting monetary value from the player and for allowing the player to place a wager from the associated monetary value.

In one embodiment, the gaming machine 10 may be configured to award winnings for one or more winning wagering game outcomes. Such winnings may be represented as credits, points or the like. In one embodiment, the player may “cash out” and thus remove previously associated funds and any awarded winnings or such may otherwise be paid to the player. These winnings may be associated with the player’s credit balance, thus increasing the player’s credit balance.

In one embodiment, the player may provide an input to the gaming machine 10 to indicate their desire to cash out, such as by selecting a “cash out” button (such as implemented via one of the buttons 30) or touch screen feature or providing other input. In response, a monetary value represented by the player’s credit balance, or the like is preferably paid, transferred or otherwise provided to the player. For example, upon an award or at cash-out, associated funds may be paid to the player by the gaming machine 10 dispensing coins to a coin tray. In another embodiment, funds may be issued by dispensing paper currency or other media. In yet another embodiment, a player may be issued a media, such as a printed ticket, which ticket represents the value which was paid or cashed out of the machine. The aspects of gaming machine “ticketing” systems are well known. In yet another embodiment, the cash-out might result in the dispensing of a card or other media which stores or represents the cashed-out funds, such as by writing funds information to a magnetic stripe of a card which is inserted into a media writer of the gaming machine or dispensed from the machine. In other embodiments, the cash-out mechanism may result in the funds value being transferred to an external device or account, such as a player’s casino account (such as associated with a casino server), a remote bank or other financial account, or an electronic device such as a player’s phone, PDA, or tablet.

The gaming machine 10 may also include a player tracking device, such as a card reader and associated keypad. Such player tracking devices are well known and may permit the game operator to track the play of players of the gaming machine. The tracked play may be utilized to offer player bonuses or awards.

A casino or gaming property may have numerous such gaming machines 10, such as located on a casino floor or in other locations. Of course, such gaming machines 10 might be used in other environments, such as an airport, a bar or tavern or other locations.

It will be appreciated that the gaming machine illustrated in FIGS. 1A-1B is only exemplary of one embodiment of a gaming machine. For example, it is possible for the gaming machine to have various other configurations, including different shapes and styles and having different components than as just described.

As noted, the gaming machine 10 may, as noted above, be part of a system which includes other devices. For example, the gaming machine 10 may communicate with one or more casino systems, such as a player tracking server or system, an accounting system or server, a ticketing system, a bonusing system, a tournament system, other gaming machines, and external devices.

General Operation—Shipping and Assembled Configurations of the Gaming Machine Cabinet 10

In one aspect of the present invention, the gaming machine cabinet 12 is associated with a gaming machine 10 and is configured between a shipping configuration and an assembled configuration. Generally, the gaming machine cabinet 12 has a reduced height, $h_{shipping}$ (see FIG. 2A), when in the shipping configuration, relative to the assembled configuration. When the gaming machine cabinet 12 in the assembled configuration (see, for example, FIGS. 1A and 1B), the height of the gaming machine cabinet 12 (even without the attendant light assembly 102) may exceed the maximum height for common or economical shipping vehicles or trucks. For instance, some shipping vehicles have a maximum allowable height of 90". Thus, the height of the gaming machine cabinet 12 has to be below 90", for example, approximately 89", in order to fit within such trucks.

As discussed in more detail below, relative to the assembled configuration, the monitor assembly 20 is positioned downward (or rotated and positioned downward) when the gaming machine cabinet 12 is in the shipping configuration. Thus, in the illustrated embodiments, the depth of the gaming machine cabinet 12 when in the shipping configuration, $d_{shipping}$, (see FIG. 2A) may be greater than the depth of the gaming machine cabinet 12 when in the assembled configuration. The depth of the gaming machine cabinet 12 should also be less than a footprint of common shipping pallets, e.g., 36". The display device(s) 22, 22A, 22B may be mounted within the monitor assembly 20. The monitor assembly 20 may be mounted to a tower assembly 34 of the upper unit 18 of the gaming machine cabinet 12. In the illustrated embodiment, the monitor assembly 20 may be connected directly to a chassis 36 of the tower assembly 34 (see below).

Further, as discussed above, the monitor assembly 20 may be moveable between shipping and intermediate positions and between the intermediate positions and a closed position. The shipping position of the monitor assembly 20 may be associated with the shipping configuration of the gaming machine cabinet 12 and the closed position of the monitor assembly 20 may be associated with the assembled (or closed) configuration of the gaming machine cabinet 12.

As will be discussed in more detail below, in some embodiments, the monitor assembly 20 is hinged relative to the upper unit 18 via the tower assembly 34. In these embodiments, the tower assembly 34 forms a hinge configured to allow the monitor assembly 20 to be controllably moved to the shipping, intermediate and closed positions. In other embodiments, the monitor assembly 20 is slidably coupled to the tower assembly 34 to allow the monitor assembly 20 to be controllably slid between the shipping, intermediate and closed positions.

Hinged Tower Assembly

With specific reference to FIGS. 2A-2E, 3A-3I, and 4A-4D, and 1B, the gaming machine cabinet 12 includes the main unit 16 and the upper unit 18. In the illustrated embodiment, the main unit 16 includes the base cabinet 32, and the upper unit 18 includes the tower assembly 34. The base cabinet 32 includes an upper end 32A, a bottom end 32B, a front side 32C, and a rear side 32D. As shown, the tower assembly 34 includes the chassis 36, a lower tower 38, an upper tower 40, and a rear tower frame 46.

The chassis 36 is configured to receive the monitor assembly 20. As will be discussed in more detail below, the lower tower 38 may be coupled to the upper end 32A of the base cabinet 32 and extend upward therefrom. In the illustrated embodiment, the lower tower 38 and the upper tower 40 form a hinge 42 at a pivot point 44 (see FIG. 3A).

As shown, in the illustrated embodiment, the lower tower 38 includes a lower tower upper end 38A and a lower tower bottom end 38B. Further, the upper tower 40 includes an upper tower upper end 40A and an upper tower bottom end 40B. In the embodiment, the lower tower 38 and the upper tower 40 may be formed from stamped steel.

Figure 2A:
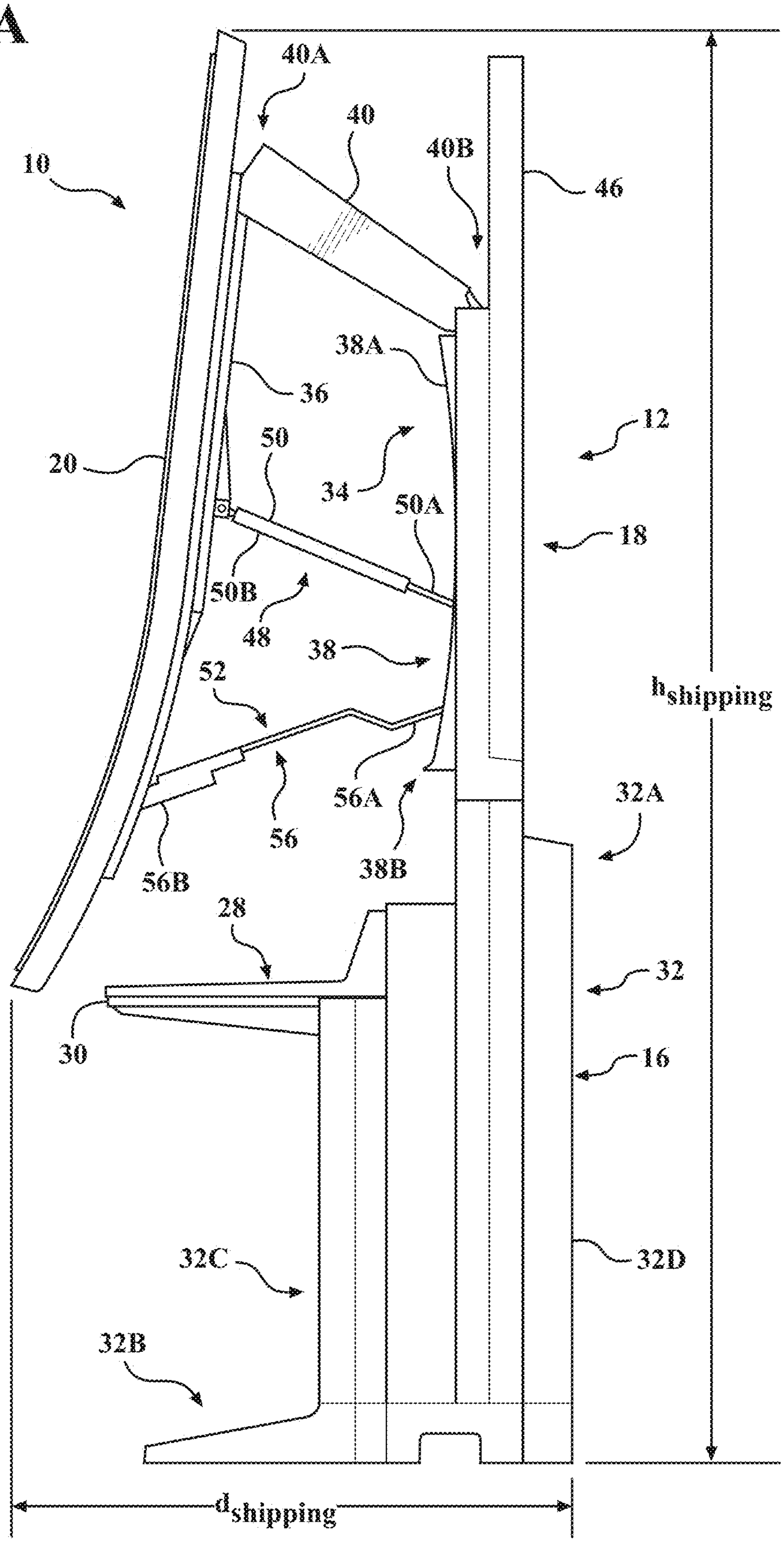
FIG. 2A is a side view of the gaming machine cabinet of FIG. 1A, according to a first embodiment, in a shipping configuration with a monitor assembly in a shipping position and a removable brace device in a shipping state.
Figure 2B:
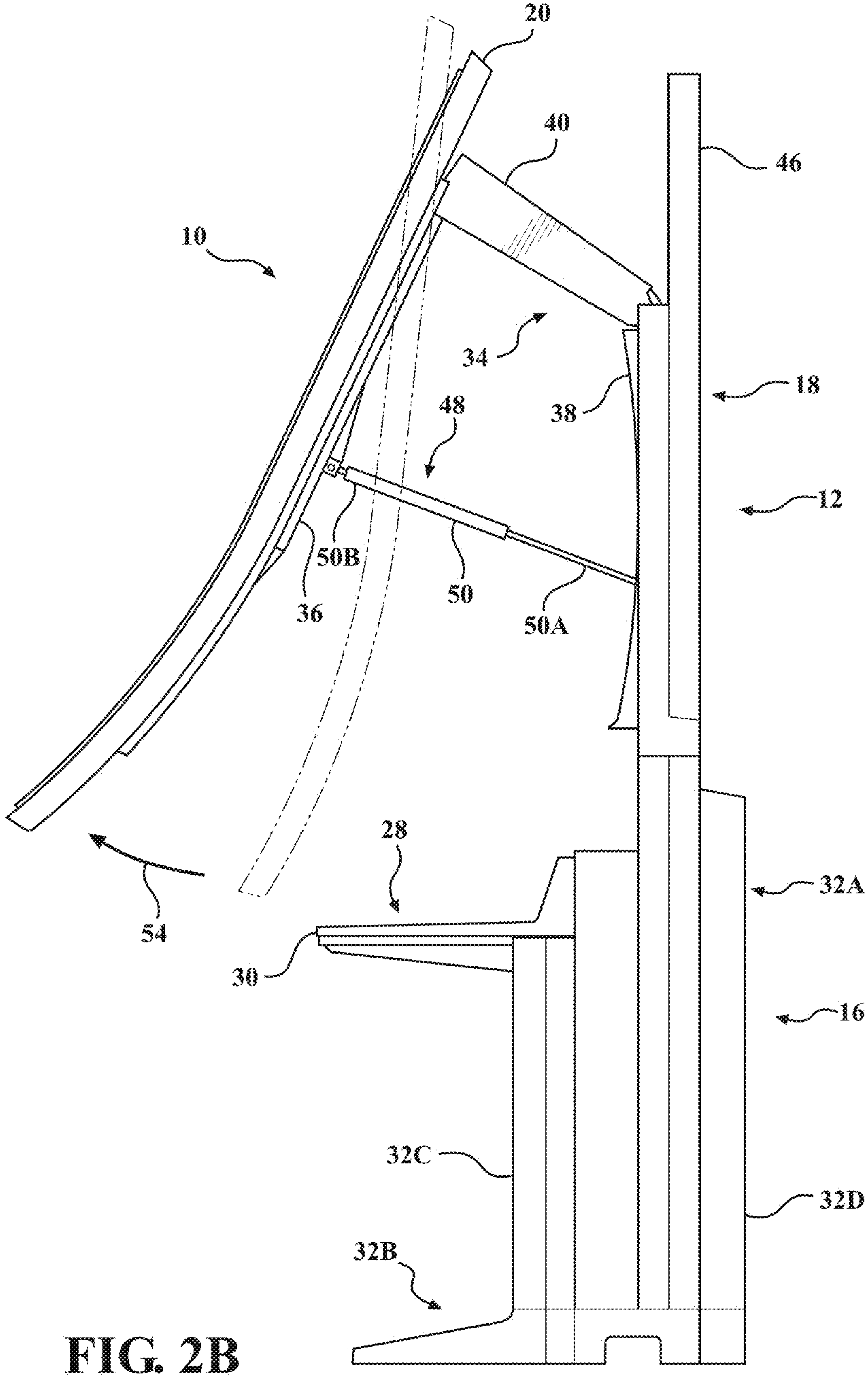
FIG. 2B is a side view of the gaming machine cabinet of FIG. 2A with the removable brace device in a removed state.
Figure 2C:
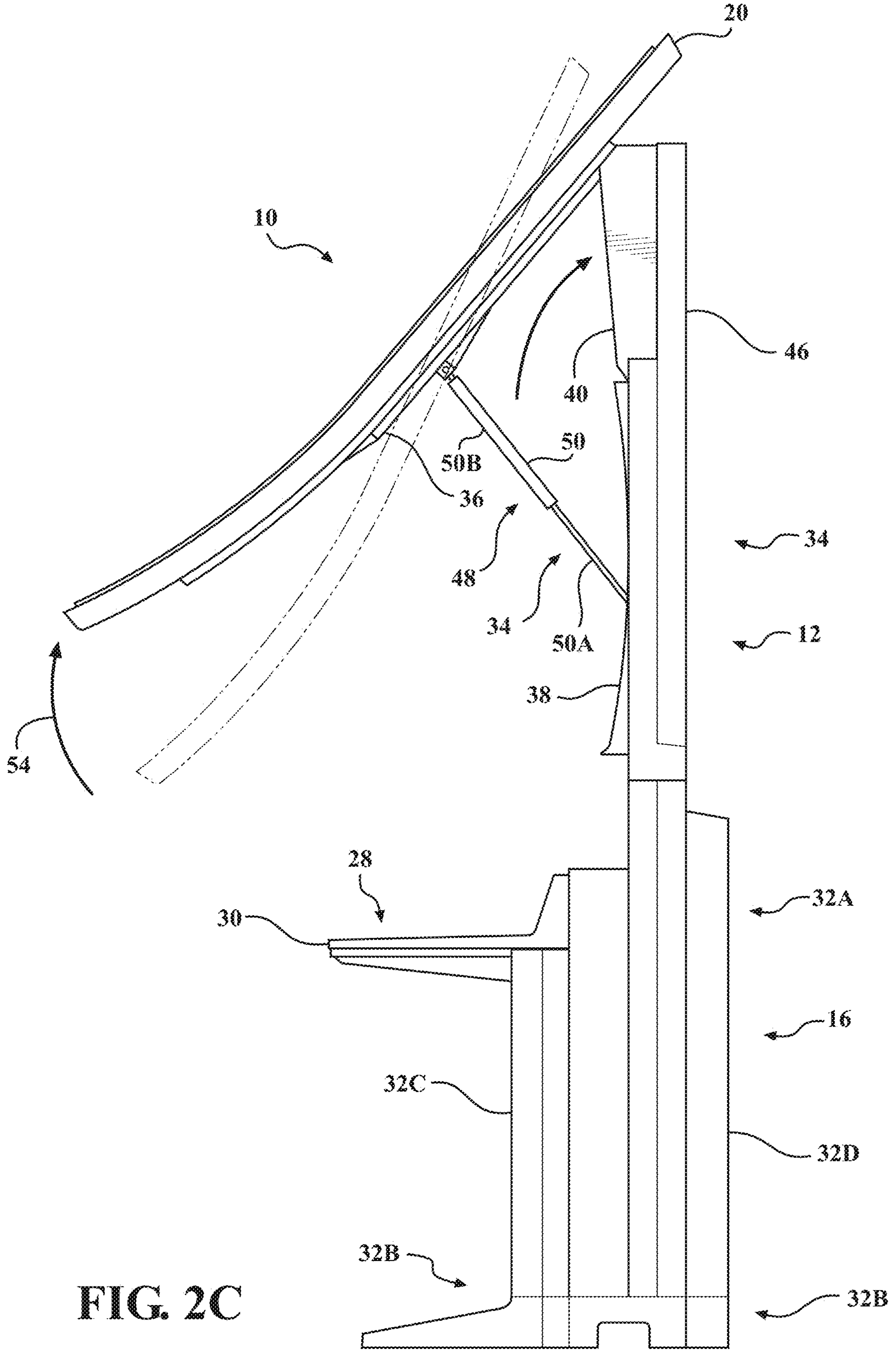
FIG. 2C is a side view of the gaming machine cabinet of FIG. 2A with the monitor assembly in an intermediate position.
Figure 2D:
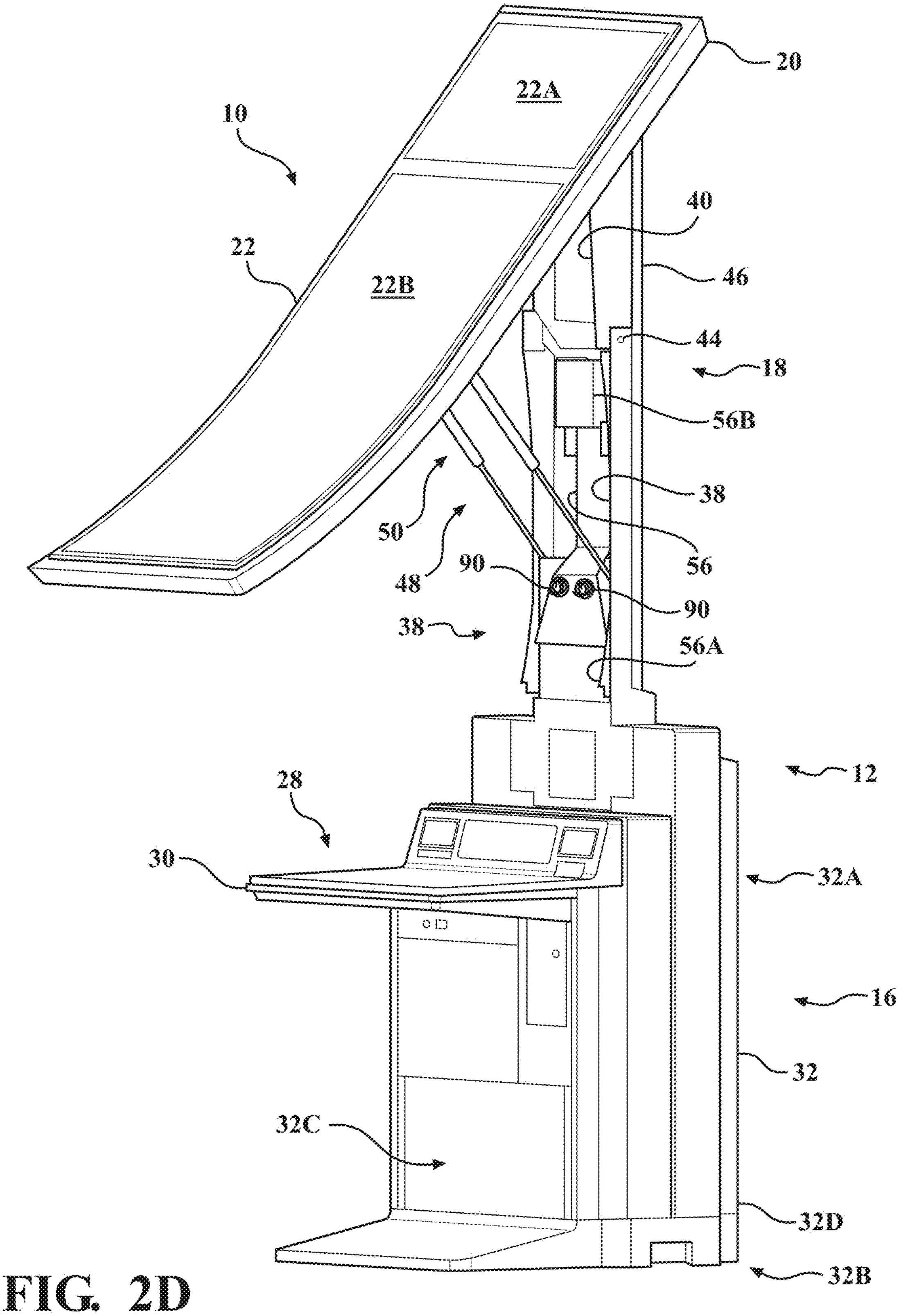
FIG. 2D is a perspective view of the gaming machine cabinet of FIG. 2A with the monitor assembly in the intermediate position.
Figure 2E:
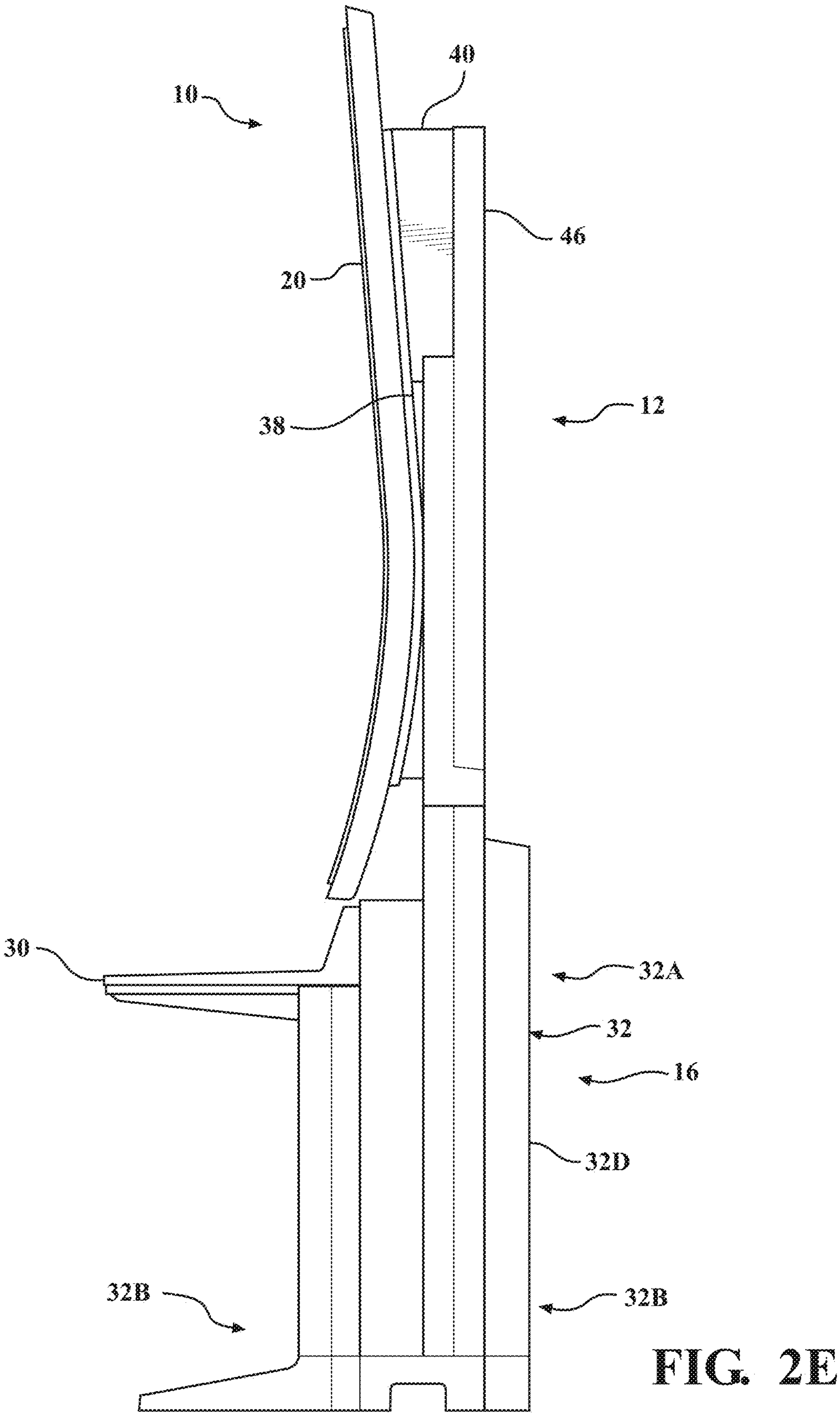
FIG. 2E is a side view of the gaming machine cabinet of FIG. 2A with the monitor assembly in the closed position.

In the illustrated embodiment, the upper tower 40 is rotatably coupled to the lower tower 38 at the pivot point 44 which may be defined by a set of fasteners (not shown) and moveable between a first tower position (shown in FIGS. 2A and 2B) and a second tower position (see FIG. 2D). In the illustrated embodiment, the pivot points 44 are fixed with respect to both the lower tower 38 and the upper tower 40. As shown in FIGS. 2B and 2C, in the first position the monitor assembly 20 is rotated forward from, and away from the rear tower frame 46. The upper tower 40 is in the first tower position when the monitor assembly 20 is in the shipping position and in the second tower position when the monitor assembly 20 is in the intermediate and closed positions.

Figure 3A:
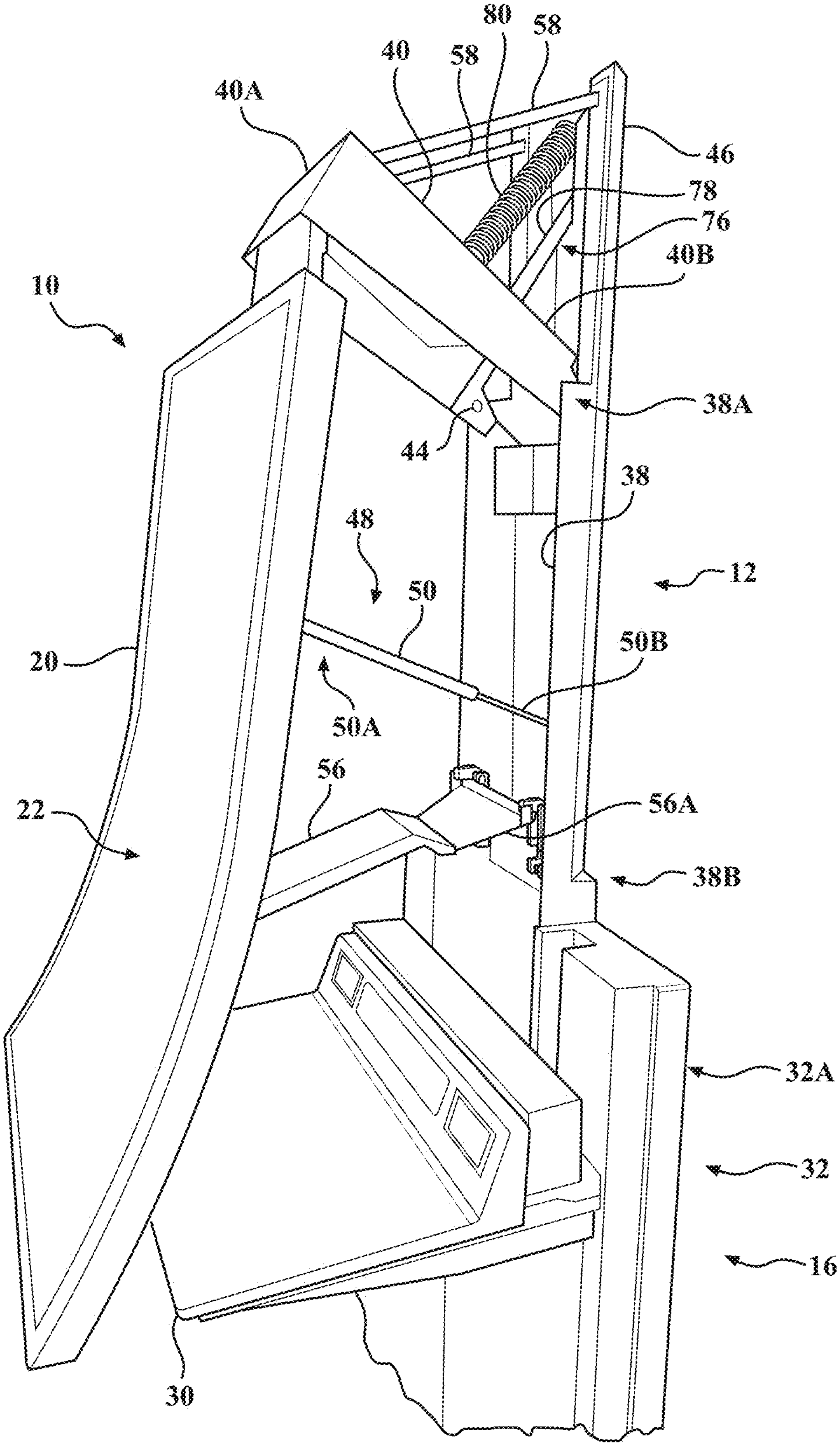
FIG. 3A is a partial perspective view gaming machine cabinet of FIG. 2A, including a tower assembly including a lower tower and an upper tower, according to an embodiment of the present invention.
Figure 3B:
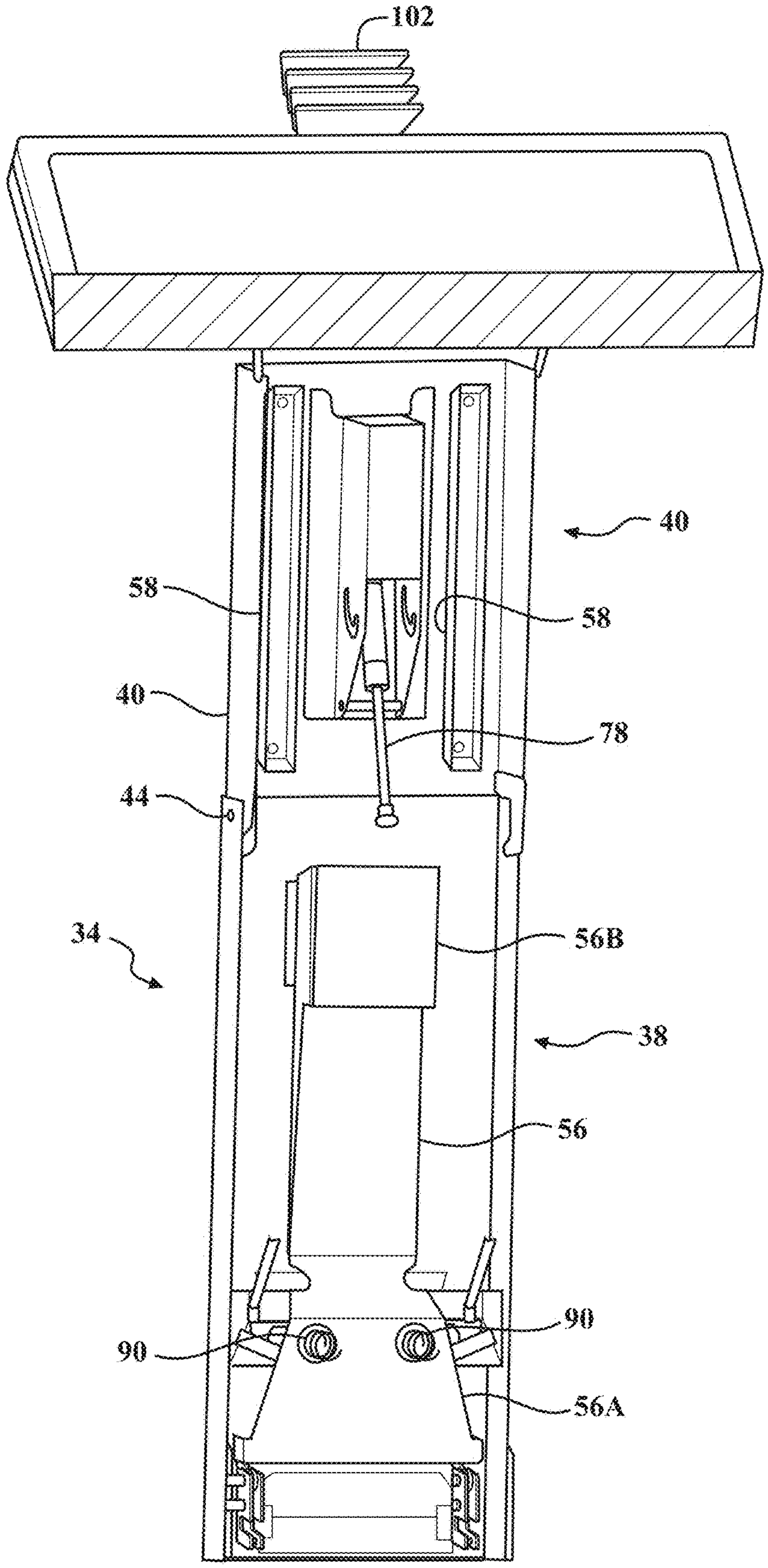
FIG. 3B is a front view of rear tower frame of the gamine machine cabinet of FIG. 3A.
Figure 3C:
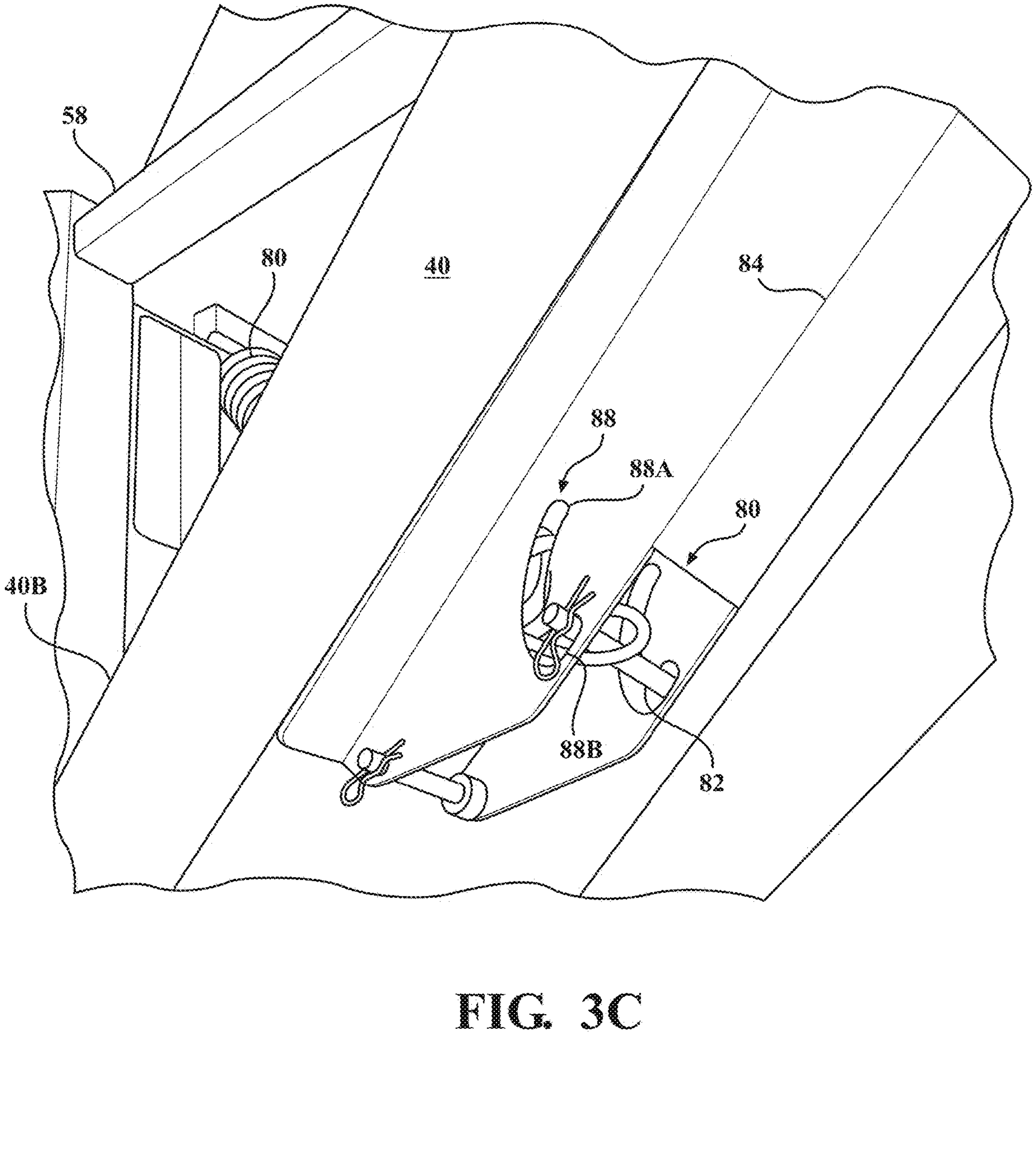
FIG. 3C is a first partial perspective view of the monitor assembly of FIG. 2A.

As shown, the lower tower 38 may be fixedly connected or mounted to the base cabinet 32. With particular reference to FIGS. 2D and 3A, in the illustrated embodiment, the lower tower 38 includes a rear panel 38C, and first and second side flanges 38D, 38E extending from the rear panel 38C to provide rigidity and strength to the lower tower 38. With particular reference to FIGS. 2D and 3B, the pivot points 44 may be located, and defined, in/by the first and second side flanges 38D, 38E. The upper tower 40 is rotatably coupled to the lower tower 38 at the pivot point 44, by a fastener (not shown) at each side of the tower assembly 34, such as a nut and bolt and/or sleeve bearing.

As shown, the upper tower 40 includes a rear panel 40C, first and second side flanges 40D, 40E and an upper flange 40F. The first, second and upper flanges 40D, 40E, 40F provide rigidity and strength to the upper tower 40.

Returning to FIG. 2A, the gaming machine cabinet 12 may further include a biasing mechanism 48 rotatably coupled between the tower assembly 34 and the monitor assembly 20. In the illustrated embodiment, the biasing mechanism 48 which may be in the form of a pair of gas springs 50 or other suitable mechanisms. Each gas spring 50 has a first end 50A coupled to the lower tower 38 and a second end 50B coupled to the monitor assembly 20 (via the chassis 36). The first and second ends 50A, 50B of the gas springs 50 may be connected to the lower tower 38 and the chassis 36 via respective fasteners (not shown).

As will be explained in more detail below, the biasing mechanism 48 applies an outward biasing force which acts to rotate the monitor assembly 20 in direction of arrow 54 (sec FIGS. 2B and 2C). When the monitor assembly 20 is in the shipping position, the pair of gas springs 52 are slightly compressed. In one aspect of the present invention, the biasing mechanism 48 also provides assistance in completing the assembly process.

A removable brace device 52 is configured to support the weight of the monitor assembly 20 when the gaming machine cabinet 12 is in the shipping configuration and the monitor assembly is in the shipping positioned. The removable brace device 52 has a shipping state (sec FIGS. 2A and 3A) and a removed state. The removable brace device 52 is removed for preparation of assembly of the gaming machine cabinet 12.

In the illustrated embodiment the removable brace device 52 includes a lower brace 56. As shown in FIGS. 3A, in the illustrated embodiment the lower brace 56 includes a first end 56A and a second end 56B. The first end 56A of the lower brace 56 is rotatably coupled to the lower tower 48 and the second end 56B of the lower brace 56 is removably connected to the monitor assembly 20. When the gaming machine cabinet 12 is in the shipping configuration and the monitor assembly 20 is in the shipping position, the lower brace 56 is connected between the tower assembly 34 and the monitor assembly 20 to maintain the monitor assembly 20 in the shipping position. The lower brace 56 may be rotatably coupled to the lower tower 48 and removable coupled to the monitor assembly 20 by suitable fasteners.

As discussed in more detail below, during the assembly process, the second end 56B of the lower brace 56 is disconnected from the monitor assembly 20. The biasing force (arrow 54) applied by the biasing mechanism 48 (or gas springs 50) prevents the monitor assembly 20 from falling and may push/rotate the monitor assembly 20 outward (sec FIG. 2B).

As shown in FIG. 3A, the removable brace device 52 may also include at least one upper brace 58. As shown in the illustrated embodiment, a pair of upper braces 58 are connected between the rear tower frame 46 and the upper tower 40 when the monitor assembly is in the shipping position. The upper braces 58 are removed prior to assembly of the gaming machine cabinet 12. The lower and upper braces 58 may be stored within the gaming machine cabinet 12 during the assembly process.

As discussed in more detail below, the monitor assembly 20 may then be pushed and rotated upward to an intermediate position. In the illustrated embodiment, as shown in FIG. 2C, the upper tower 40 is vertical when the monitor assembly 20 is in the intermediate position. With the upper tower 40 vertical, the lower brace 56 may then be rotated upward and fastened to the tower assembly 34 for storage (sec FIGS. 2D and 3B). The upper braces 58 may also be fastened (using fasteners) to the inside of the tower assembly 34 for storage (when the gaming machine cabinet 12 is in the assembled configuration).

Figure 3D:
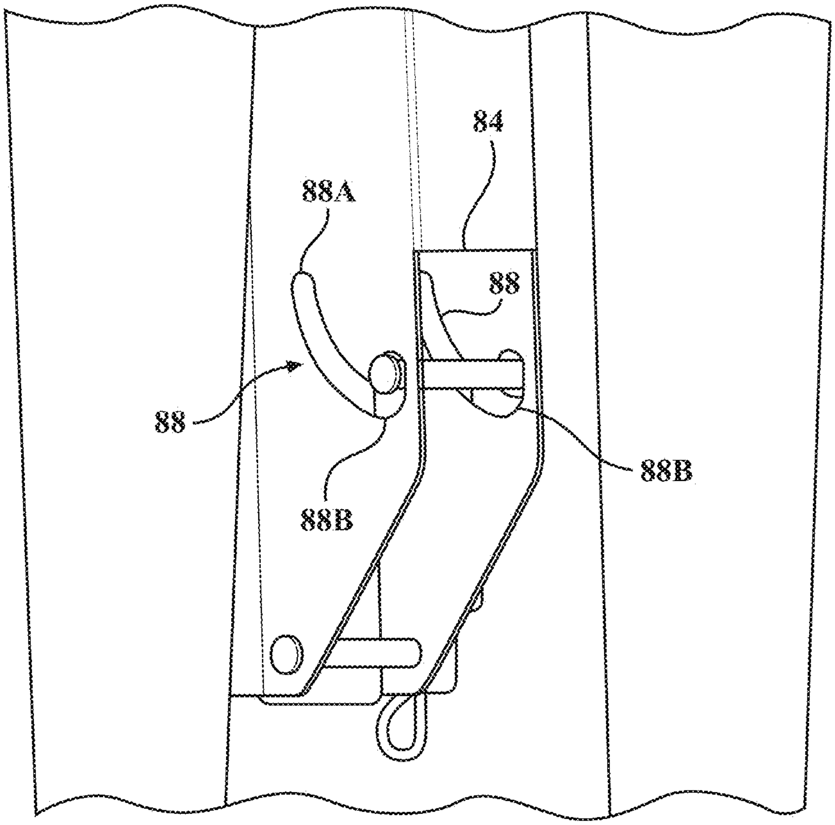
FIG. 3D is a second partial view of the monitor assembly of FIG. 2A.
Figure 3E:
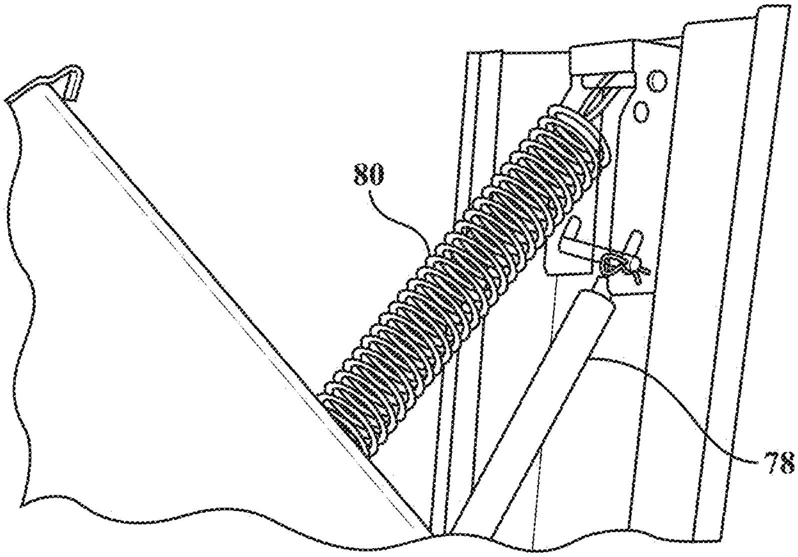
FIG. 3E is a partial perspective view of the monitor assembly, rear tower frame and dampener, according to an embodiment of the present invention.
Figure 3F:
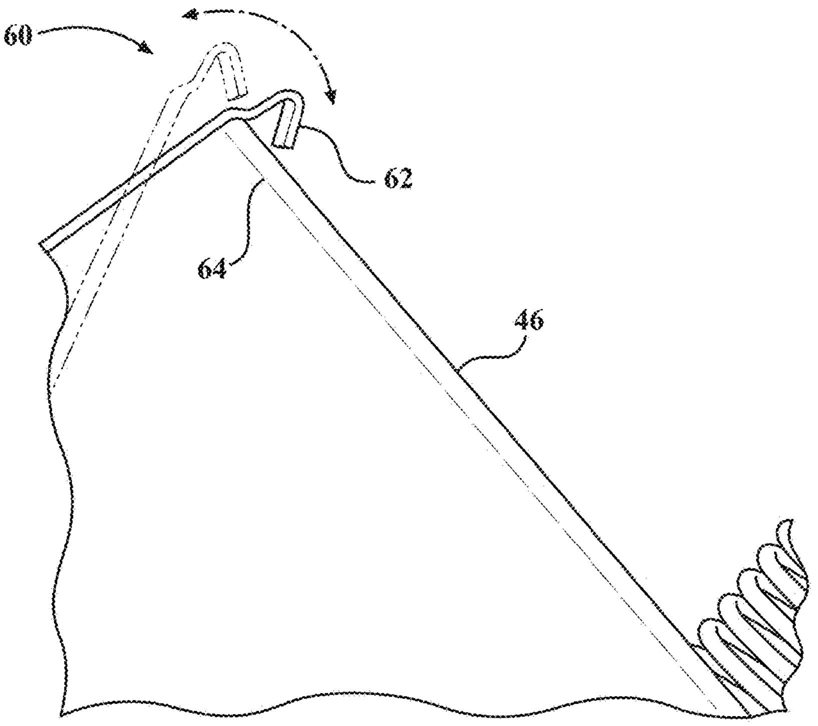
FIG. 3F is a partial perspective view of a coupling mechanism associated with the monitor assembly of FIG. 2A.
Figure 3G:
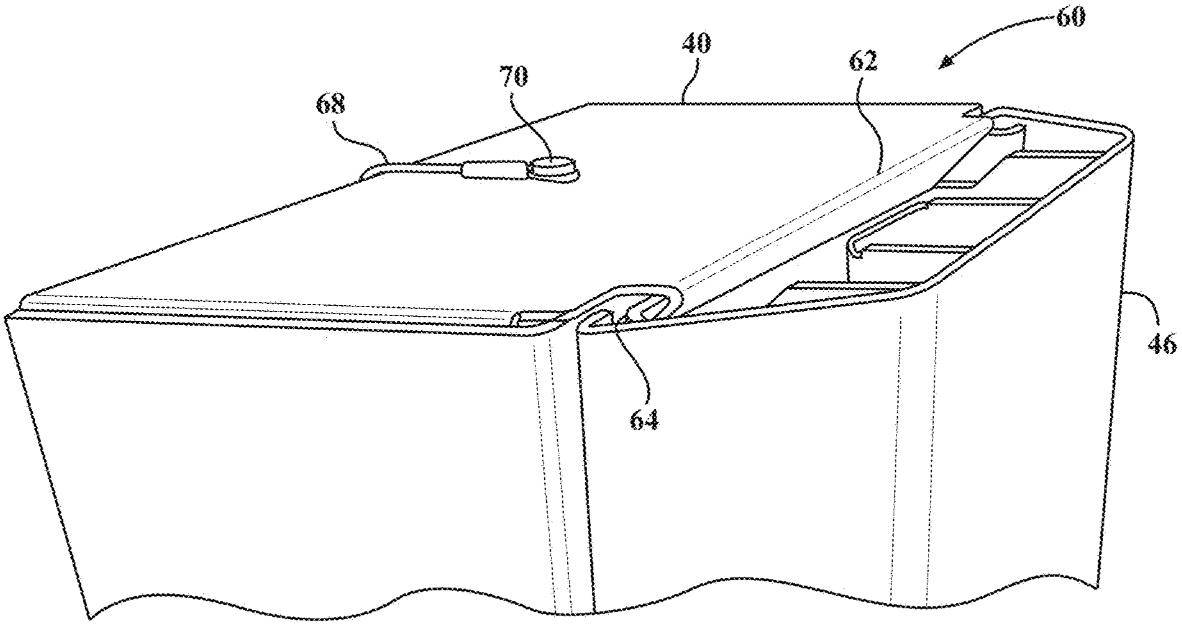
FIG. 3G is a second partial perspective view of the coupling mechanism of FIG. 3F.
Figure 3H:
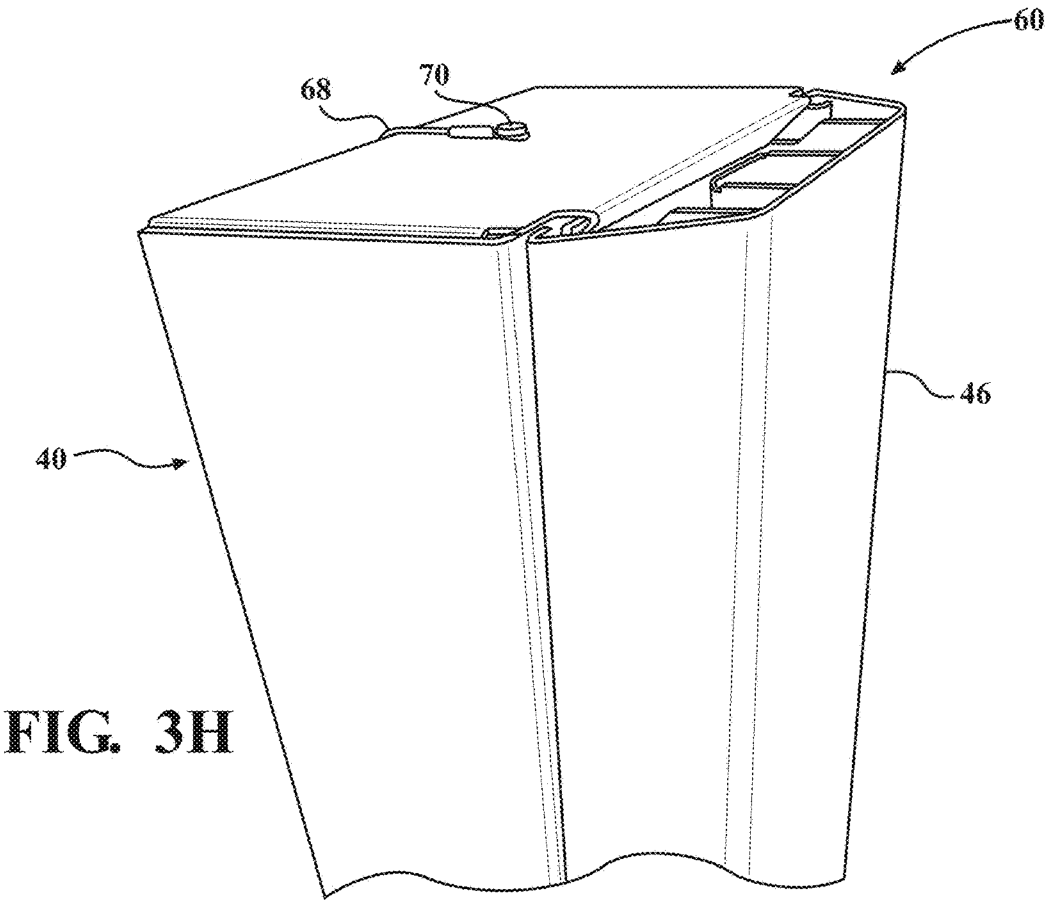
FIG. 3H is a third partial perspective view of the coupling mechanism of FIG. 3F.
Figure 3I:
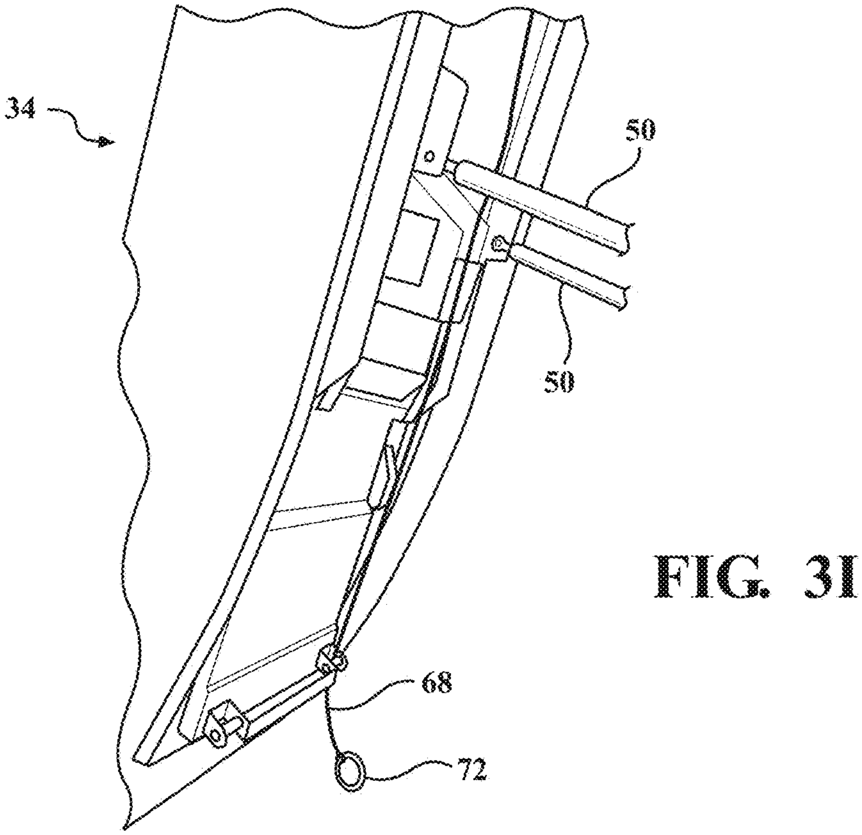
FIG. 3I is a partial perspective view of the monitor assembly of FIG. 2A including a release cable.

With particular reference to FIGS. 3F-3H, in another aspect of the present invention, the monitor 20 includes a coupling mechanism 60 configured to rotatably couple the monitor assembly 20 to the tower assembly 34 when the monitor assembly 20 is in the intermediate position. The monitor assembly 20 is configured to rotate about the coupling mechanism 60 from the intermediate position to the closed position. The coupling mechanism 60 may include a hook-shaped flange 62 coupled to, or located at, at a top portion of the monitor assembly 20 and a top edge 62 of the tower assembly 34. In the illustrated embodiment, the hook-shaped flange 62 is formed by a back panel of the monitor assembly 20. As the monitor assembly 20 is moved from the shipping position to the intermediate position, the hook-shaped flange 62 is configured to slide up and over the top edge 64 of the tower assembly 34 and latch thereto. This allows the monitor assembly 20 to be rotatably fixed to the tower assemble 34, and allows the monitor assembly 20 to be rotated downward about the coupling mechanism 60 from the intermediate position to the closed position.

Figure 4A:
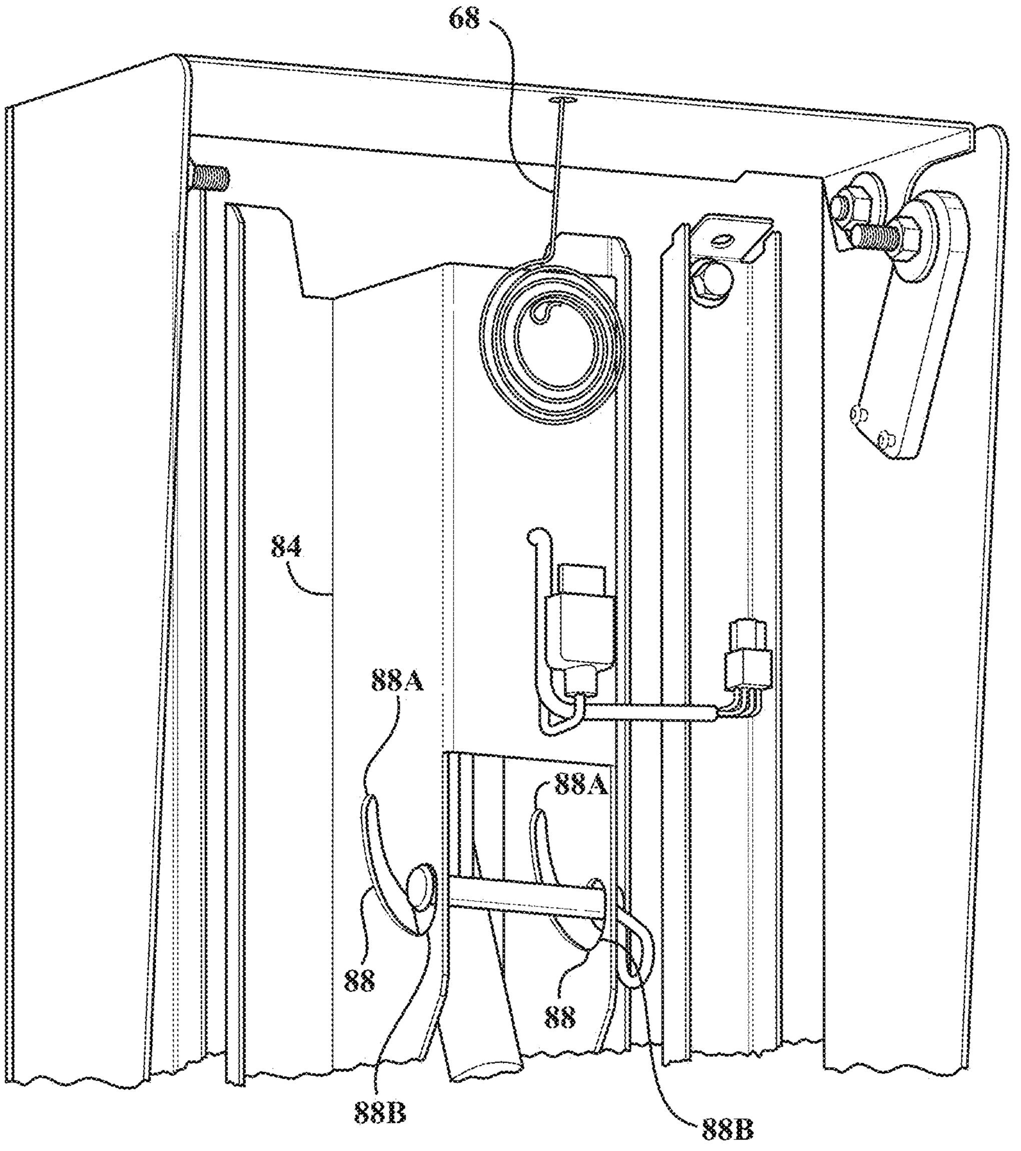
FIG. 4A is a partial perspective view of the upper tower of FIG. 3A, according to an embodiment of the present invention.
Figure 4B:
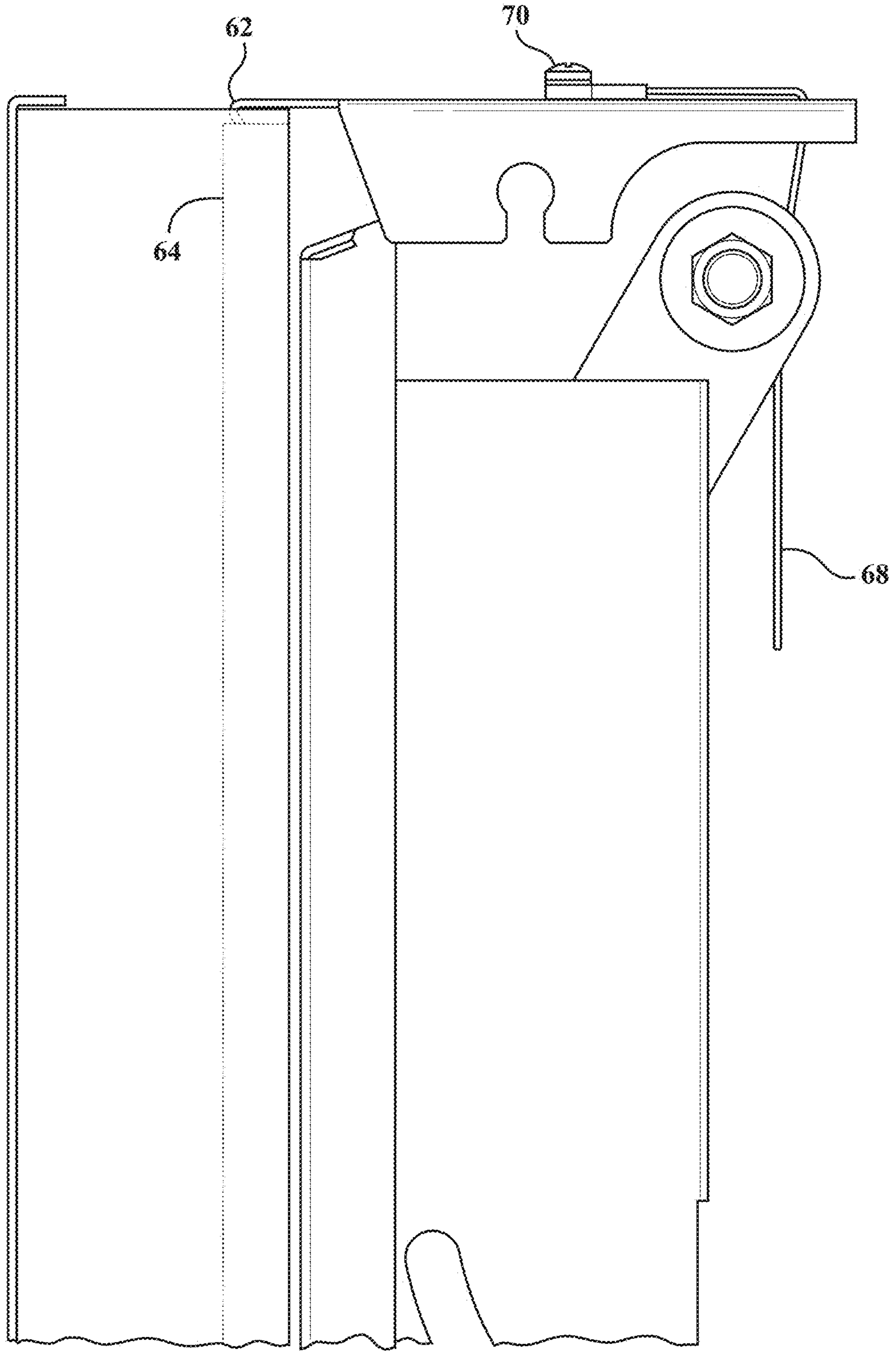
FIG. 4B is a partial side view of the upper tower of FIG. 3A, according to an embodiment of the present invention.
Figure 4C:
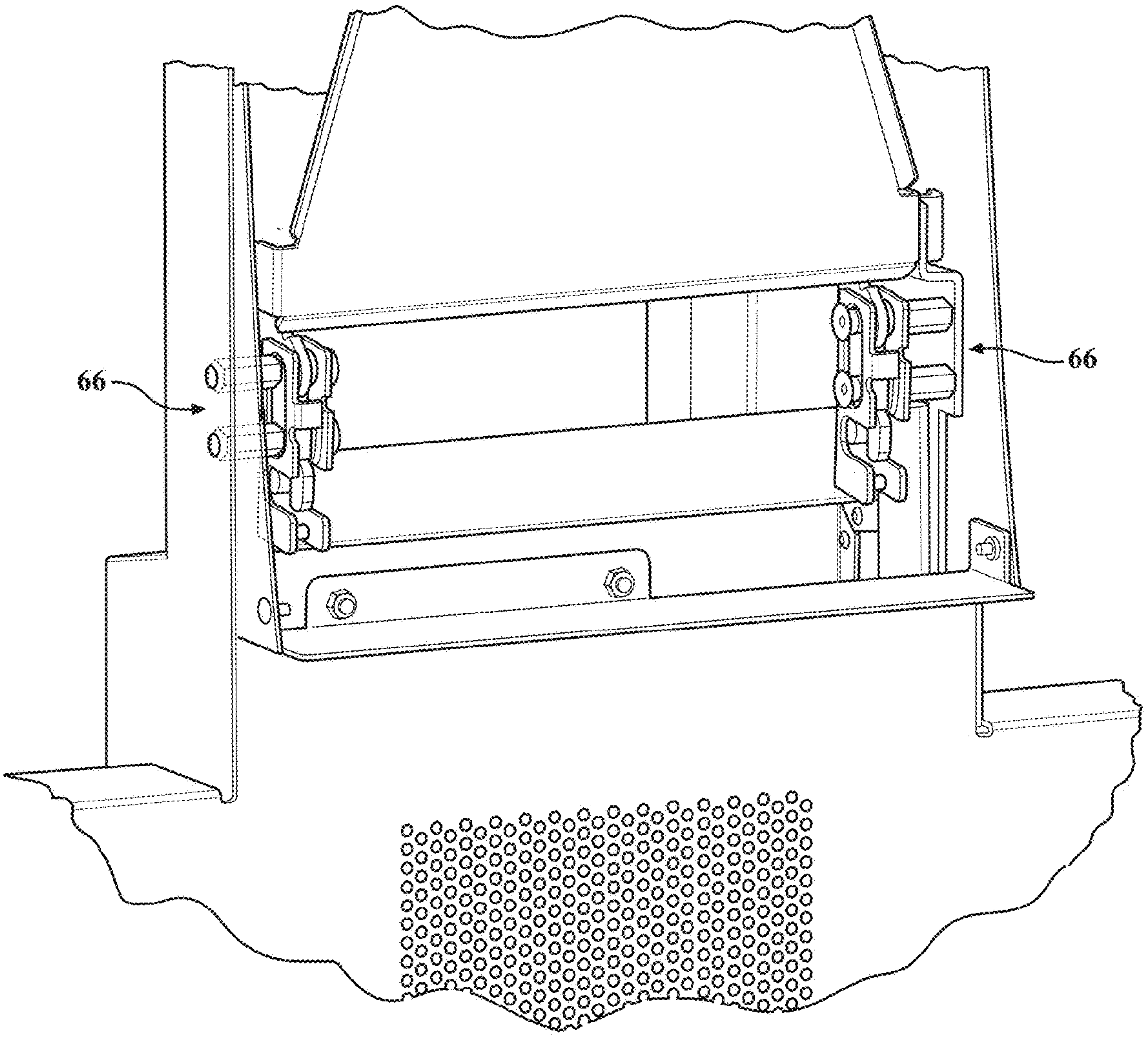
FIG. 4C is a partial perspective view of a latching mechanism associated with the monitor assembly of FIG. 2A, according to an embodiment of the present invention.
Figure 4D:
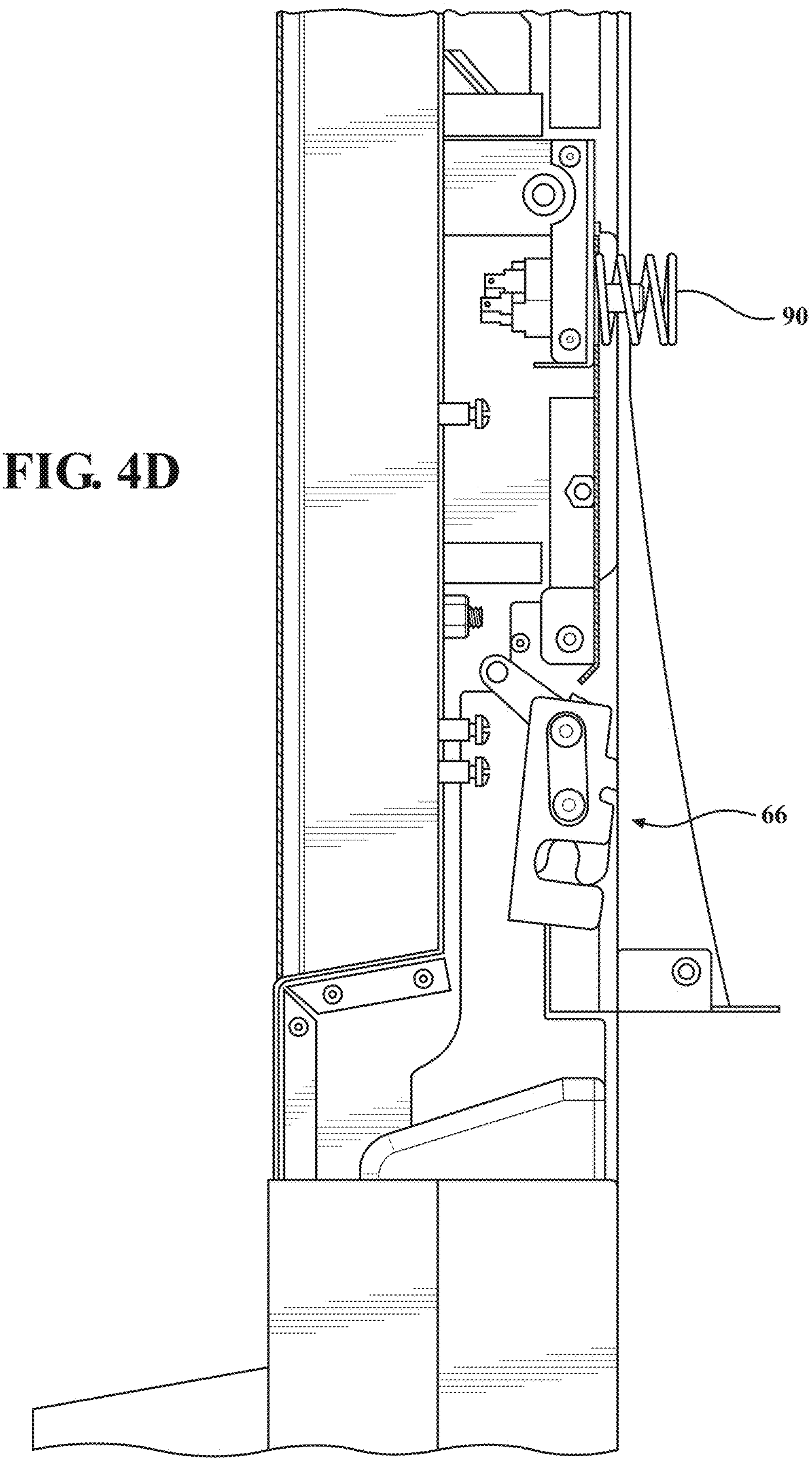
FIG. 4D is a side view of the latching mechanism of FIG. 4C.

With specific reference to FIGS. 4C-4D, a latch mechanism 66 has an unlocked and locked position. Once the monitor assembly 20 is in the closed position the latch mechanism 66 may be moved from the unlocked to the locked position to controllably lock the monitor assembly 20 in the closed position.

If the gaming machine cabinet 12 needs to be moved and/or placed back into the shipping configuration, the latch mechanism 66 may be moved from the latched position to the open position, the monitor assembly 20 moved from the closed position to the intermediate position. With specific reference to FIGS. 3G-3I, the gaming machine cabinet 12 includes a release cable 68. In the illustrated embodiment, the release cable 68 has one end fixedly connected to the top of the monitor assembly 20 by a fastener 70 and the opposite end moveably connected to a bottom end of the monitor assembly 20. A handle 72 is connected to the opposite end of the release cable 68. With the monitor assembly 20 in the intermediate position, the monitor assembly 20 may be pushed upward to release the hook-shaped flange 62 from the top edge 64 of the tower assembly 34. Then the release cable 68 may be pulled downward in the direction of arrow 74 resulting in the top of the monitor assembly 20 being moved away from the tower assembly 34. The monitor assembly 20 may then be rotated downward into the shipping position.

With reference to FIGS. 3D-3E, in another aspect of the present invention, the gaming machine cabinet includes a dampening mechanism 76. The dampening mechanism 76 is coupled between the rear tower frame 46 and the upper tower 40. As discussed in more detail below, the dampening mechanism 76 may provide a biasing force against the upper tower 40 and away from the rear tower frame 46 to assist in preventing the upper tower 40 to unintentionally close or come into contact with the rear tower frame 46. Further, the dampening mechanism 76 may further controllably provide a second force (acting opposite the biasing force) to assist the upper tower 40 in pivoting towards the rear tower frame 46, particularly as the upper tower 40 nears the second tower position.

In the illustrated embodiment, the dampening mechanism 76 includes a gas spring 78 coupled between the rear tower frame 46 and the upper tower 40. The gas spring 78 may provide the biasing force. The dampening mechanism 76 may further include a spring 80, such as a coil spring, having a first end connected to the rear tower 76. In the illustrated embodiment, the spring 80 is connected to the rear tower frame 46 at one end. The other end of the spring 80 is connected to a dampener attachment clevis pin 82. With particular reference to FIG. 3D, a bracket 84 is affixed to a rear surface of the upper tower 40. The bracket 84 has two opposing sides 86 with a slot 88 formed therein. Each slot 88 has a first end 88A and a notched end 88B. During shipping, the dampener attachment clevis pin 82 is positioned with the first end 88A of each slot 88. During assembly, the dampener attachment clevis pin 82 may be manually moved from the first end 88A of the slots 88 to the notched end 88B thereby increasing the distance between each end of the spring 80 and the force exerted by the spring 80 on the upper tower 40. A tool (not shown), such as a wrench or a vise-grip pliers, may be used to move the dampener attachment clevis pin 82 from the first end 88A to the notched end 88B of the slots 88.

As discussed above, in one aspect of the invention, the gaming machine cabinet 12 may be shipped when in the shipping configuration which the monitor assembly 20 in the shipping position. In one aspect of the present invention, the display devices 22, 22A, 22B are mounted within the monitor assembly 20 and the monitor assembly 20 mounted or connected to the tower assembly 34 prior to the gaming machine cabinet 12 being shipped. With the gaming machine cabinet 12 is in the assembled configuration, (FIGS. 1A and 1B), the overall height of the gaming machine cabinet (with our without the attendant light assembly 102) may exceed the maximum height for common or economical shipping vehicles or trucks. For instance, some shipping vehicles have a maximum allowable height of 90". With the gaming machine cabinet 12 in the shipping configuration, the height of the gaming machine cabinet 12, $h_{shipping}$, is below the maximum allowable height, for example, approximately 89", in order to fit within such trucks.

With particular reference to FIG. 2A, a side view of the gaming machine cabinet 12 while in the shipping configuration is shown. The upper tower 40 is in the first tower position, i.e., the upper tower 40 is folded or rotated downward relative to the rear tower frame 46. The lower brace 56 holds the monitor assembly 20 in place and the gas springs 50 are slightly compressed.

Once the gaming machine cabinet 12 has been shipped and placed at, or near, its installation location, the gaming machine cabinet 12 is ready to be assembled, i.e., placed into the assembled configuration. First, the removable brace device 52 is removed, and in one embodiment, may be stored in the gaming machine cabinet 12. In the illustrated embodiment, the removable brace device 52 includes the lower brace 56 and may include at least one upper brace 58. In the illustrated embodiment, the second end 56B of the lower brace 56 is disconnected from the rear of the monitor assembly 20. The first end 56A of the lower brace 56 is rotatably coupled to the lower tower 38. After the first end 56A is disconnected, the lower brace 56 may be rotated upward to be stored within the lower tower 38 (see FIG. 2D). A set of fasteners (not shown) may be used to hold the lower brace 56 in place. As shown in FIG. 3A, a pair of upper braces 58 are shown connected between the rear tower frame 46 and the upper tower 40. The upper braces 58 are also removed.

After the removable brace device 52 is removed, the monitor assembly 20 may be moved from the shipping position to the intermediate position. With particular reference to FIG. 2B, once the removable brace device 52 has been removed, the gas springs 40 extend and push the monitor assembly 20 outward (as shown in phantom). From this position, the user may push (on the lower end of the monitor assembly 20) the monitor assembly 20 upward towards and to the fully upward position (see FIG. 2C). As the monitor assembly 20 is pushed upwards, the upper tower 40 rotates from the first position (shown in FIG. 2B) to the second position (shown in FIG. 2C). Once the upper tower 40 is in the second position, a set of fasteners (not shown) may be used to attach or fix the upper tower 40 to the rear tower frame 46. At this point, the upper braces may be stored within the upper tower 40 (see FIG. 3B) by a set of fasteners. The braces 56, 58 once installed in the tower assembly 34 provide structural rigidity to the tower assembly 34.

The gas springs 50 provide assistance as the user pushed upward on the monitor assembly 20 to move it from the shipping position to the intermediate position. Further, as discussed above, as the monitor assembly 20 approaches the intermediate position, As the user pushes on the monitor assembly 20, the flange 62 at the top of the monitor assembly 20 is pushed over the top edge 62 of the tower assembly 34. Once the flange 62 is over the top edge 64, the monitor assembly 20 may drop down and the flange 62 receives the top edge 6462. The monitor assembly 20 is now in the intermediate position.

From the intermediate position, the monitor assembly 20 may downward about a hinge formed by the flange 62 and the top edge 64 to the closed position (shown in FIGS. 1A-1B). In the illustrated embodiment, a pair of springs 90 attached to the lower tower 38 bias the monitor assembly 20 away from the tower assembly 34. The user must push against the force exerted by the pair of springs 90 to fully close the monitor assembly 20 and then lock the monitor assembly 20 in the closed position via the latch mechanism 66. From the closed position, the springs 90 will push the monitor assembly 20 away from the tower assembly 34 if the latch mechanism 66 is unlocked.

After the monitor assembly 20 has been fully closed and locked, the attendant light assembly 102 may be mounted to the tower assembly 34. The assembled height of the gaming machine cabinet 12 is defined by the attendant light assembly 102 and may be over the maximum height for common or economical shipping vehicles or trucks, e.g., 90". In the illustrated embodiment, the assembled height of the gaming machine cabinet 12 may be approximately 96".

The steps of the assembly process have been presented or described above in a particular potential or possible order. However, it should be noted that to the extent possible, the steps could be performed in a different order.

Sliding Monitor Assembly

With reference to FIGS. 5A-5E, 6A-6D, and 7A-7E, in another aspect of the present invention in which like elements are numbered similarly, the monitor assembly 20 is slidably coupled to the tower assembly 34 to allow the monitor assembly 20 to be controllably slid between the shipping, intermediate and closed positions. The monitor assembly 20 may be moveable between shipping and intermediate positions and between the intermediate positions and a closed position. The shipping position of the monitor assembly 20 may be associated with the shipping configuration of the gaming machine cabinet 12 and the closed position of the monitor assembly 20 may be associated with the assembled (or closed) configuration of the gaming machine cabinet 12.

Figure 5A:
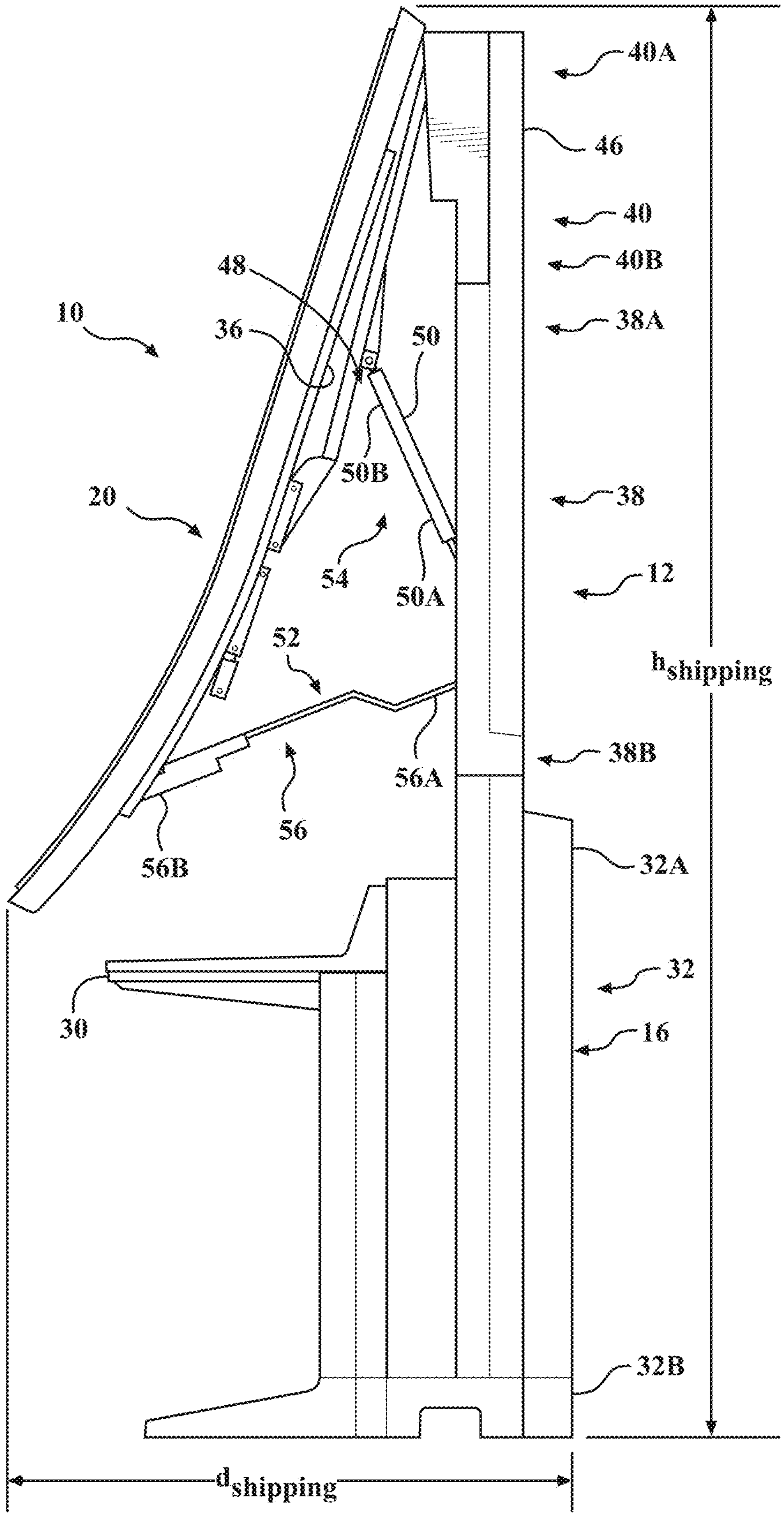
FIG. 5A is a side view of the gaming machine cabinet of FIG. 1A, according to a second embodiment, in a shipping configuration with a monitor assembly in a shipping position and a removable brace device in a shipping state.

With specific reference to FIG. 5A, the monitor assembly 20 includes a monitor chassis 36 with at least one monitor 22, 22A, 22B slidably coupled to the monitor chassis 36 (see below). As discussed in more detail below, the at least one monitor 22, 22A, 22B is slidably moveable between a first monitor position (see FIG. 5A) and a second monitor position (See FIG. 5C) along the monitor chassis. The at least one monitor 22, 22A, 22B is in the first monitor position when the monitor assembly is in the shipping position and in the second monitor position when the monitor assembly is in the intermediate and closed positions.

In the illustrated embodiment, the gaming machine cabinet 12 includes the main unit 16 and the upper unit 18. The main unit 16 includes the base cabinet 32, and the upper unit 18 includes the tower assembly 34. The base cabinet 32 includes an upper end 32A, a bottom end 32B, a front side 32C, and a rear side 32D. As shown, the tower assembly 34 includes the chassis 36, a lower tower 38, an upper tower 40, and a rear tower frame 46. The main unit 16 may include a secure or lockable container, for example, the bottom end 32B that is inaccessible from the upper end 32A to contain or secure certain components.

The chassis 36 is configured to receive the monitor assembly 20. As will be discussed in more detail below, the lower tower 38 may be coupled to the upper end 32A of the base cabinet 32 and extend upward therefrom. In the illustrated embodiment, the upper tower 40 is fixedly connected to the lower tower 38 and extends vertically therefrom (see FIG. 5A). In one embodiment, the lower tower 38 and the upper tower 40 may be formed from stamped steel.

As shown, the lower tower 38 may be fixedly connected or mounted to the base cabinet 32. In the illustrated embodiment, the lower tower 38 includes a rear panel 38C, and first and second side flanges 38D, 38E extending from the rear panel 38C to provide rigidity and strength to the lower tower 38. As shown, the upper tower 40 includes a rear panel 40C, first and second side flanges 40D, 40E and an upper flange 40F. The first, second and upper flanges 40D, 40E, 40F provide rigidity and strength to the upper tower 40.

Returning to FIG. 5A, the gaming machine cabinet 12 may further include a biasing mechanism 48 rotatably coupled between the tower assembly 34 and the monitor assembly 20. In the illustrated embodiment, the biasing mechanism 48 may include a pair of gas springs 50. Each gas spring 50 has a first end 50A coupled to the lower tower 38 and a second end 50B coupled to the monitor assembly 20 (via the chassis 36). The first and second ends 50A, 50B of the gas springs 50 may be connected to the lower tower 38 and the chassis 36 via respective fasteners (not shown).

Figure 5B:
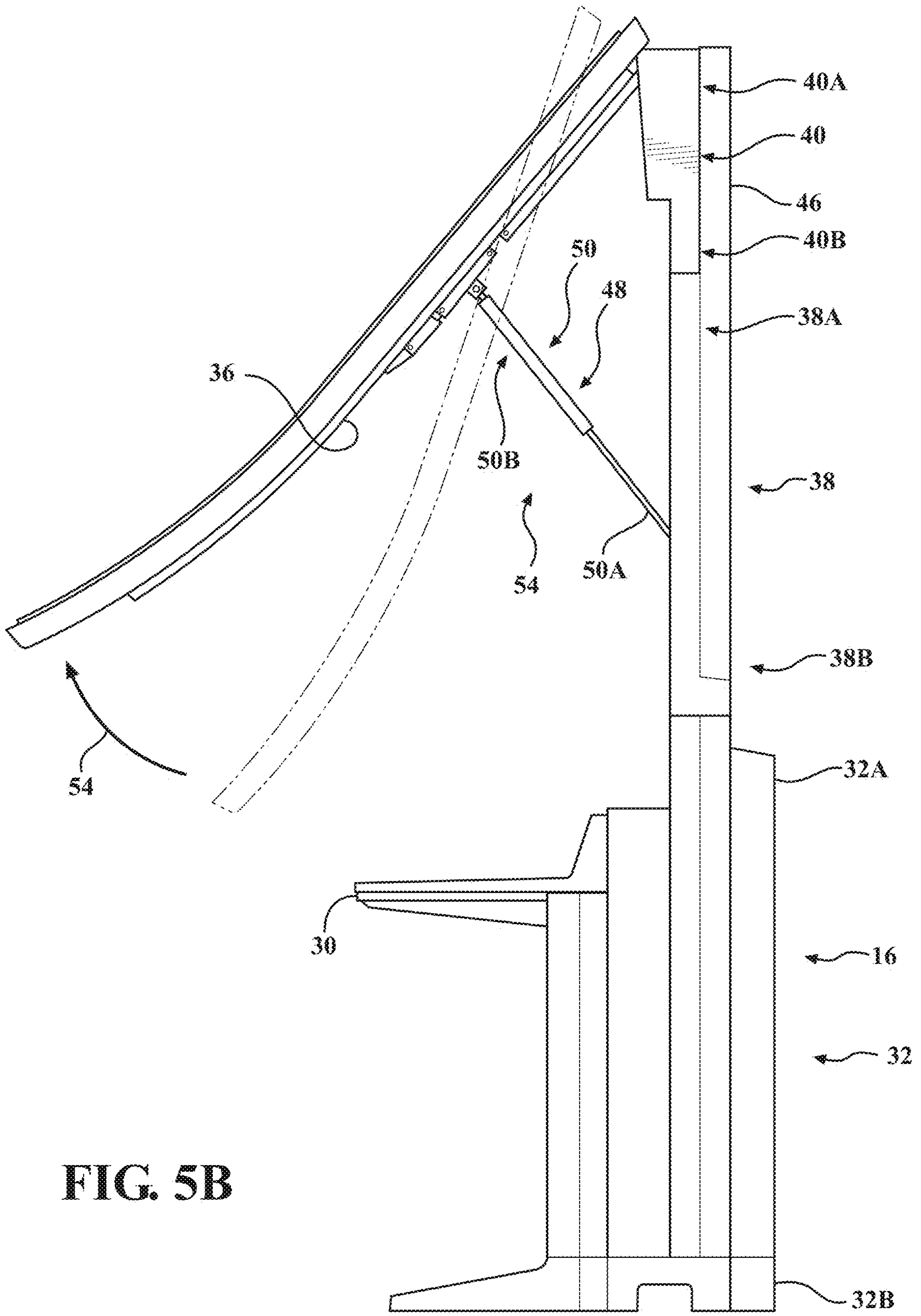
FIG. 5B is a side view of the gaming machine cabinet of FIG. 5A with the removable brace device in a removed state.

As will be explained in more detail below, the biasing mechanism 48 applies a biasing force to the in direction of arrow 54 (see FIG. 5B). When the monitor assembly 20 is in the shipping position, the biasing mechanism 48 or gas springs 52 are slightly compressed. In one aspect of the present invention, the biasing mechanism 48 may also provide assistance in completing the assembly process.

A removable brace device 52 is configured to support the weight of the monitor assembly 20 when the gaming machine cabinet 12 is in the shipping configuration and the monitor assembly 20 is in the shipping positioned. The removable brace device 52 has a shipping state (see FIG. 5A) and a removed state. The removable brace device 52 is removed in preparation of assembly of the gaming machine cabinet 12.

In the illustrated the removable brace device 52 includes a lower brace 56. As shown in FIGS. 5A and 5D, in the illustrated embodiment the lower brace 56 includes a first end 56A and a second end 56B. The first end 56A of the lower brace 56 is rotatably coupled to the lower tower 48 and the second end 56B of the lower brace 56 is removably connected to the monitor assembly 20. When the gaming machine cabinet 12 is in the shipping configuration and the monitor assembly 20 is in the shipping position, the lower brace 56 is connected between the tower assembly 34 and the monitor assembly 20 to maintain the monitor assembly 20 in the shipping position. The lower brace 56 may be rotatably coupled to the lower tower 48 and removable coupled to the monitor assembly 20 by suitable fasteners.

As discussed in more detail below, during the assembly process, the second end 56B of the lower brace 56 is disconnected from the monitor assembly 20. The biasing force (arrow 54) applied by the biasing mechanism 48 (or gas springs 50) prevents the monitor assembly 20 from falling and may push/rotate the monitor assembly 20 outward (see FIG. 5B). As shown in the illustrated embodiment, the lower brace 56 may be stored within the gaming machine cabinet 12 during the assembly process.

As discussed in more detail below, the at least one monitor 22, 22A, 22B may then be pushed and slid upward by a user/installer to an intermediate position in direction of arrow 92 (shown in FIG. 5B). Once the at least one monitor 22, 22A, 22B reaches the intermediate position along the chassis 36, the at least one monitor 22, 22A, 22B drops and clicks into place.

Figure 5C:
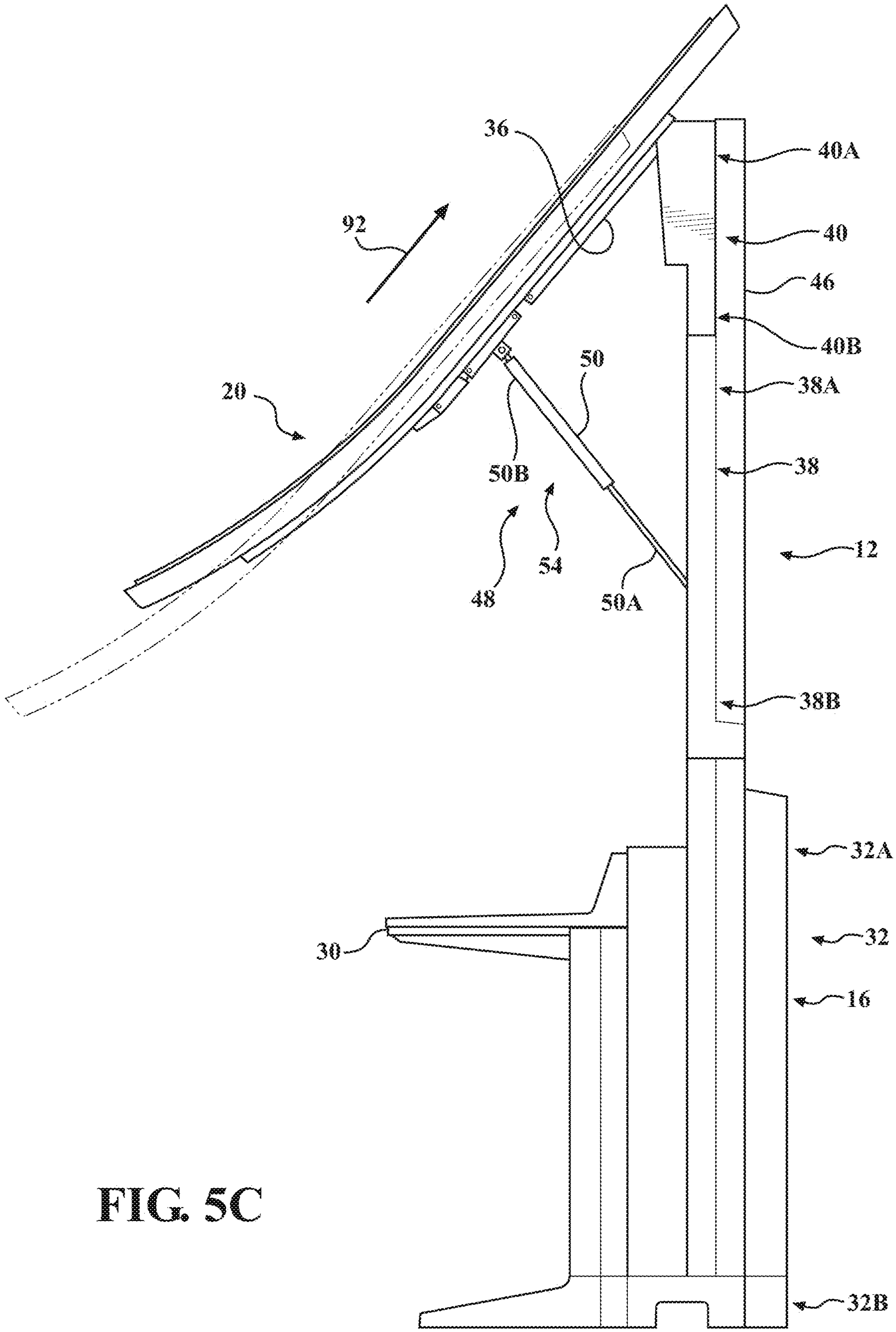
FIG. 5C is a side view of the gaming machine cabinet of FIG. 5A with the monitor assembly in an intermediate position.
Figure 5D:
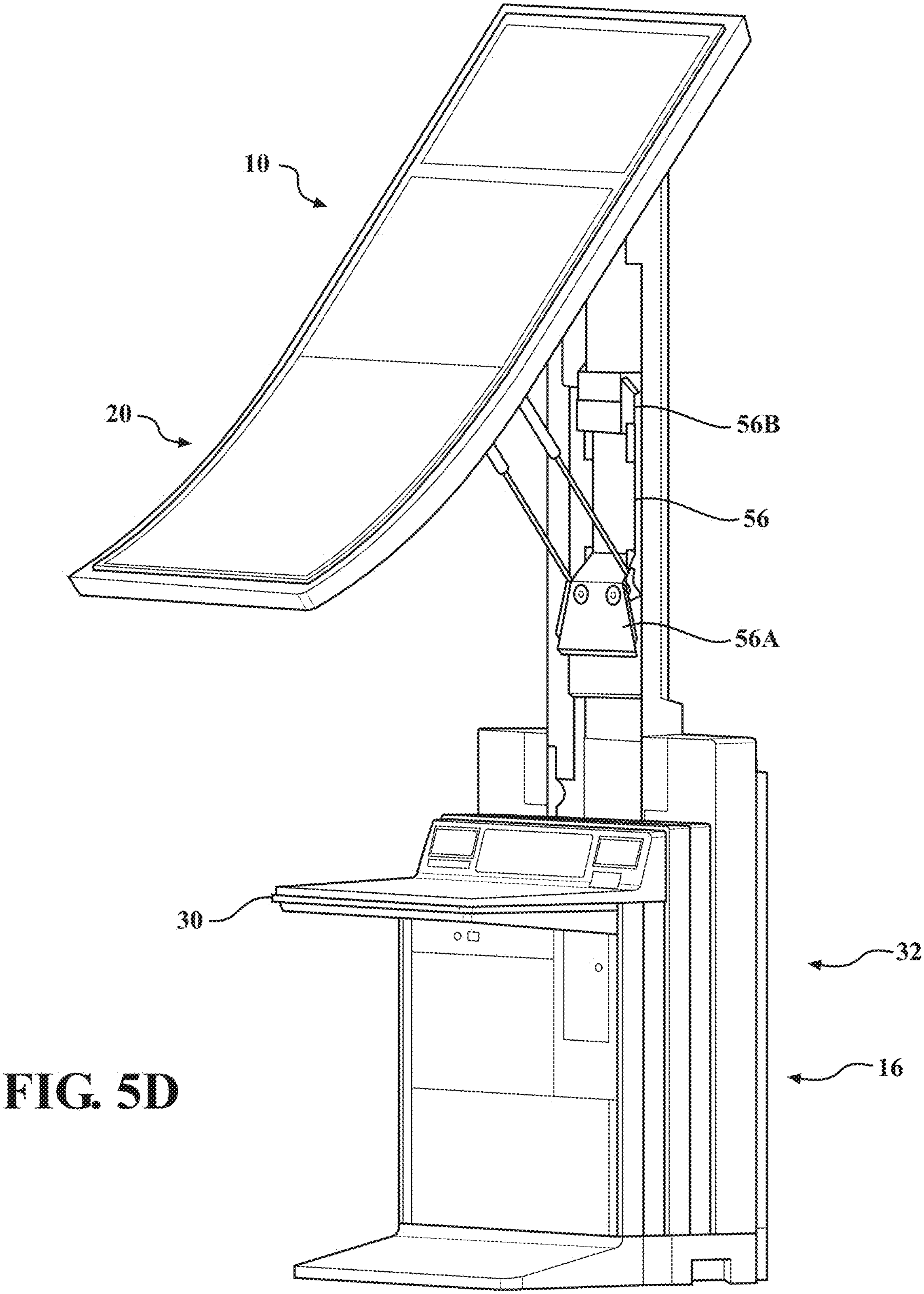
FIG. 5D is a perspective view of the gaming machine cabinet of FIG. 5A with the monitor assembly in the intermediate position.
Figure 5E:
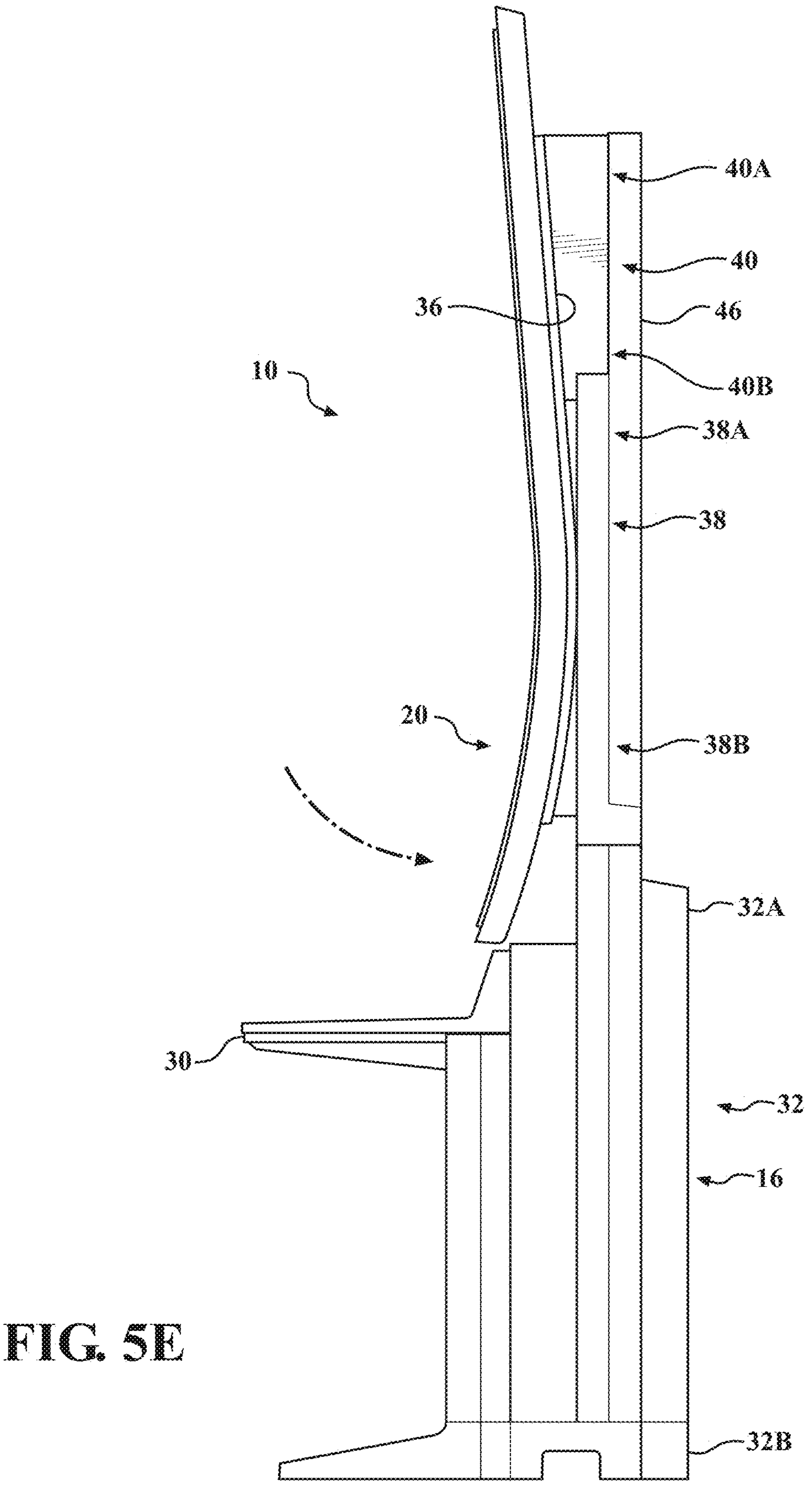
FIG. 5E is a side view of the gaming machine cabinet of FIG. 5A with the monitor assembly in the closed position.

In the illustrated embodiment, as shown in FIG. 5C, the chassis 34 is extended outward from the tower assembly 34, as shown, and the at least one monitor 22, 22A, 22B is slid forward and extends over the top of the tower assembly 34. With the monitor assembly 20 in the intermediate position, the lower brace 56 may then be rotated upward and fastened to the tower assembly 34 for storage (see FIG. 5D) using fasteners (not shown).

Once the at least one monitor 22, 22A, 22B is in the immediate position, the monitor assembly 20 may be rotated downward in direction of arrow 92 to the closed position. A latch mechanism 66 (see FIG. 7D) may be used to controllably lock the monitor assembly 20 in the closed position (see FIG. 5E).

With reference to FIGS. 6A-6D, the rear of the monitor assembly 20 is shown with the monitor assembly 20 in the shipping position. With specific reference to FIGS. 6A-6B, in the illustrated embodiment, the chassis 36 includes a pair of slots 94 configured to receive a pair of pins 96 located on back of the at least one monitor 22, 22A, 22B. The at least one monitor 22, 22A, 22B is positioned lower on the chassis 36 when in the shipping position. As discussed above, when the monitor assembly 20 is in the shipping position, the lower brace 56 is rotated forward and the second end 56B of the lower brace 56 is connected to the rear of the at least one monitor 22, 22A, 22B.

Figure 6A:
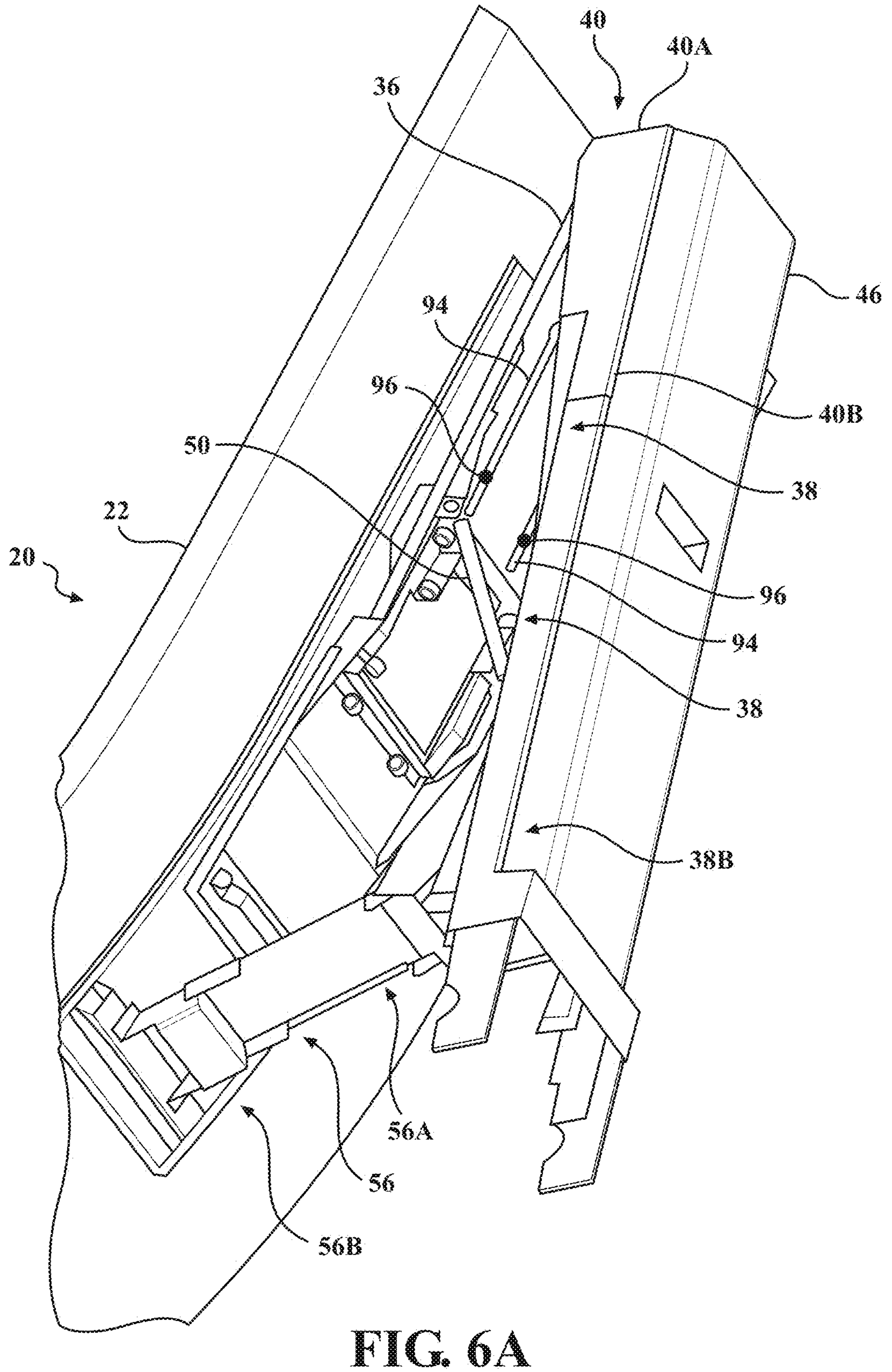
FIG. 6A is a perspective view of the monitor assembly of FIG. 5A in the shipping position and a tower assembly, according to an embodiment of the present invention.
Figure 6B:
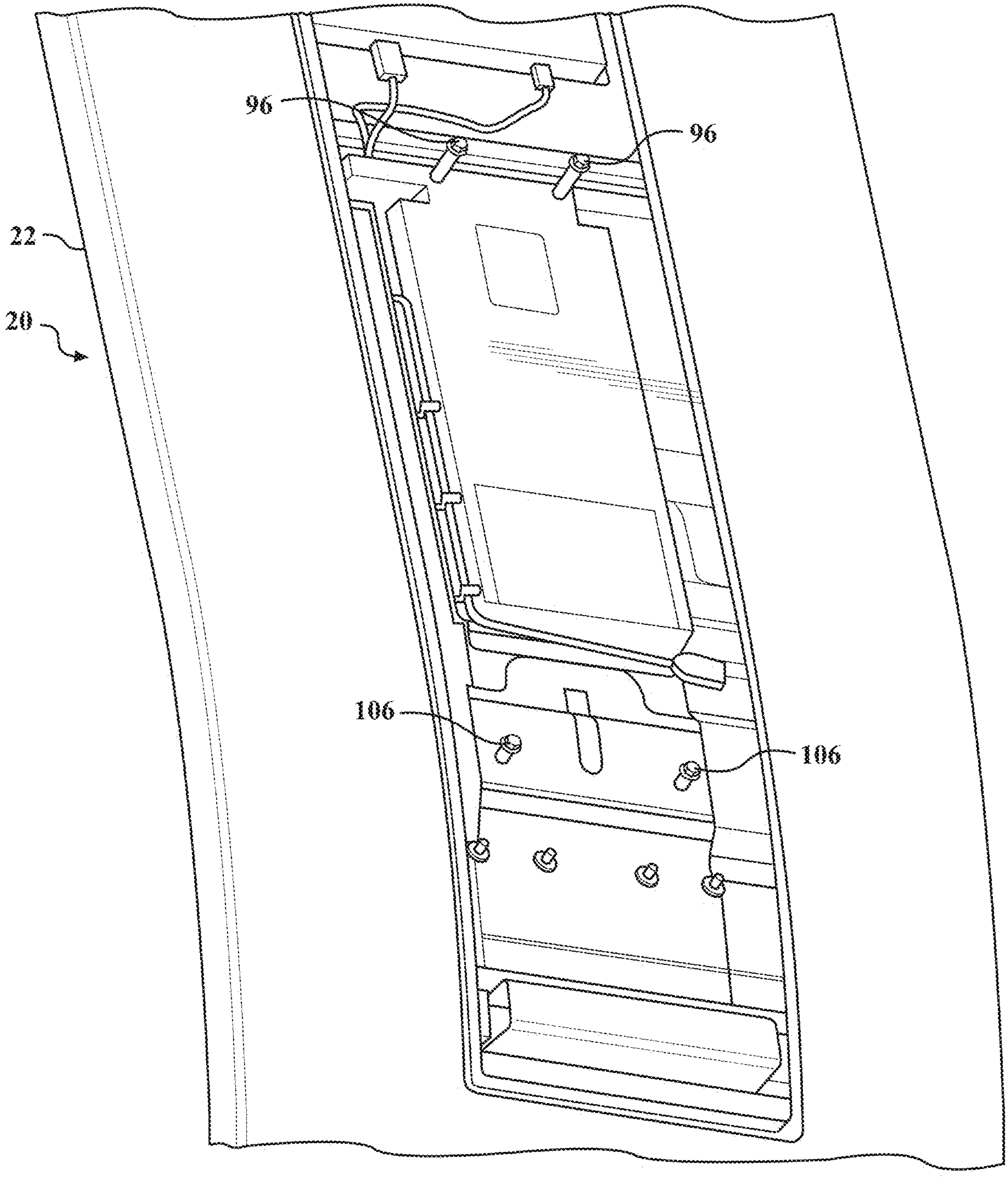
FIG. 6B is a partial perspective view of the monitor assembly of FIG. 5A.
Figure 6C:
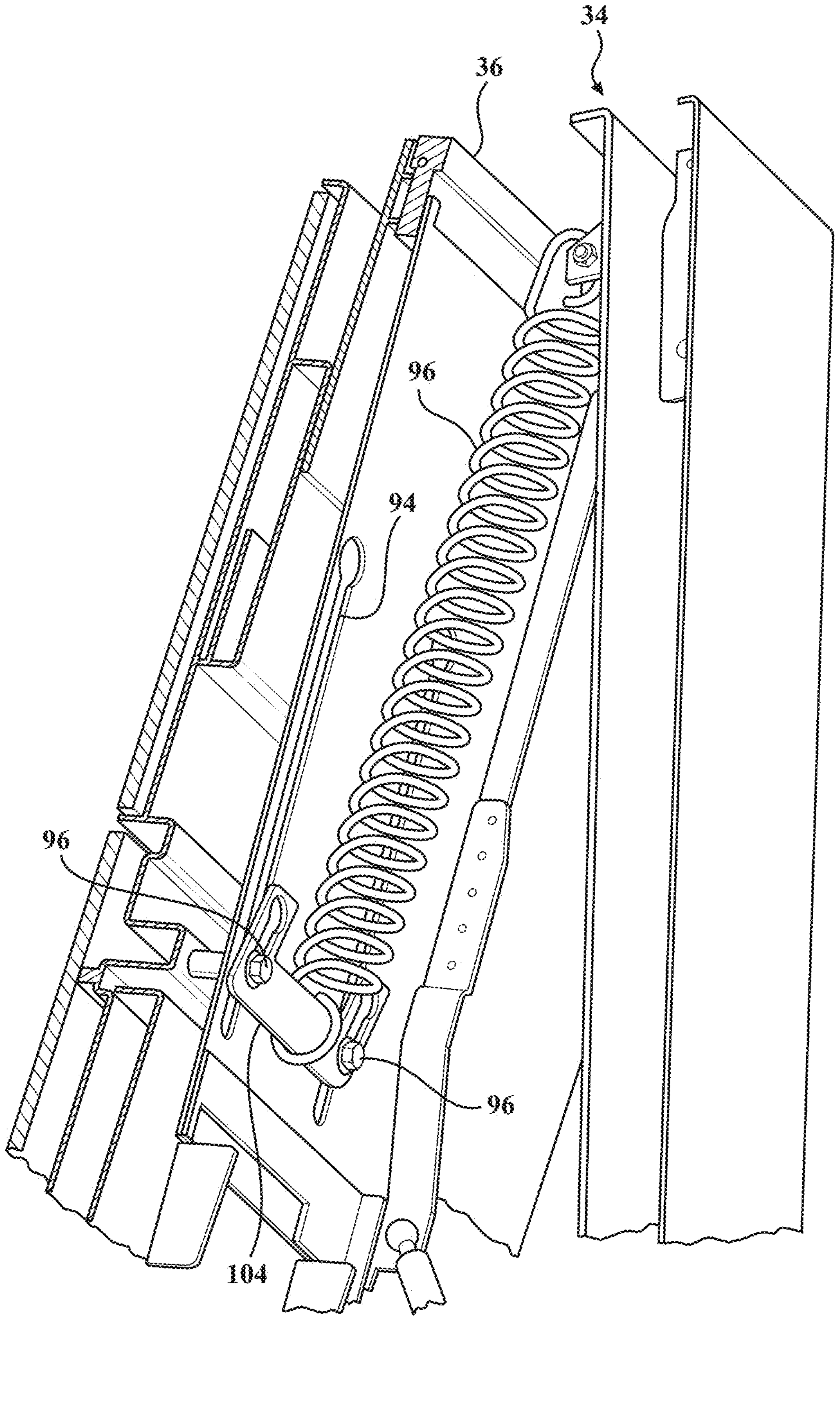
FIG. 6C is a second perspective view of the monitor assembly of FIG. 5A in the shipping position and the tower assembly.
Figure 6D:
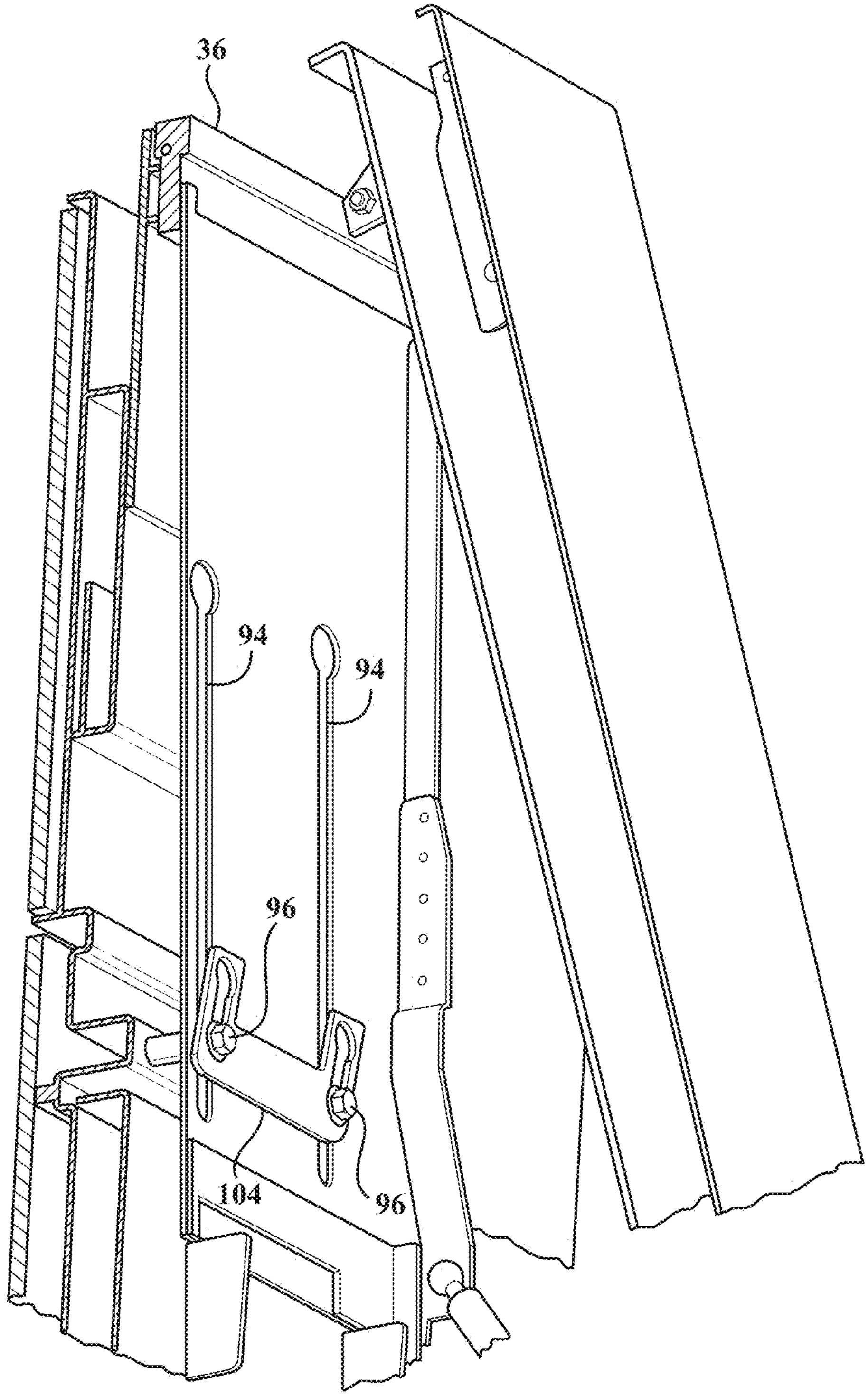
FIG. 6D is a second partial perspective view of the monitor assembly of FIG. 5A.

With reference to FIGS. 6C-6D, the monitor assembly 20 may further include an assist spring 98 connected between the tower assembly 34 and a spring mounting plate 104. The spring mounting plate 104 is connected to the at least one monitor 22, 22A, 22B via the pins 96. With the monitor assembly 20 in the shipping position, the monitor assembly 20 is held down by the lower brace 56. The spring 98 is stretched between the spring mounting plate 104 and the tower assembly 34. With the lower brace 56 removed, the spring 98 provides assistance to the user/installed as the user/installed pushes the at least one monitor 22, 22A, 22B up the chassis 46. Once the at least one monitor 22, 22A, 22B is in the intermediate position, a pair of lower pins 106 located on the back of the at least one monitor 22, 22A, 22B are received within a pair of mounting points 108 (see below) located on the chassis 36.

Figure 7A:
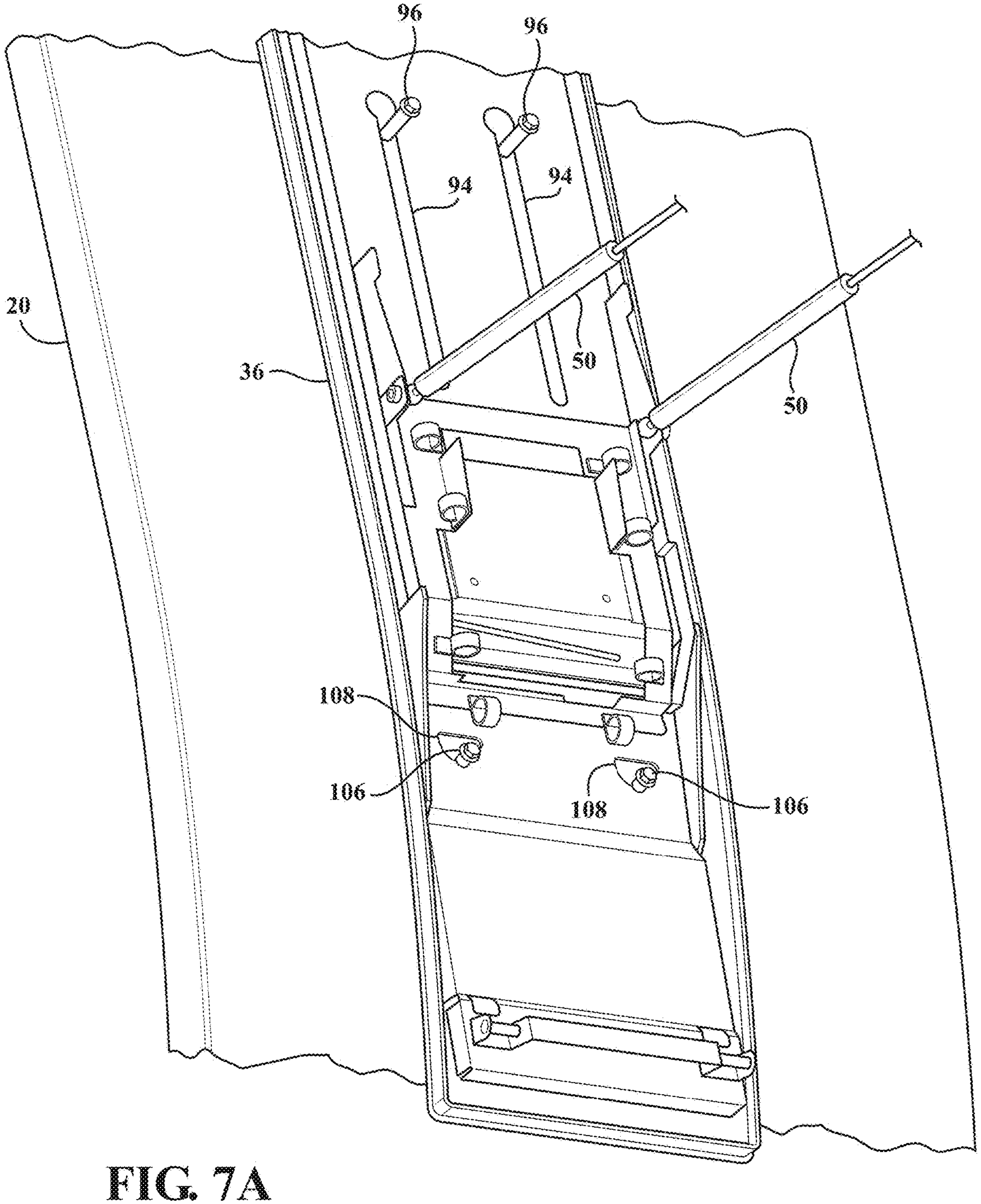
FIG. 7A is third perspective view of the monitor assembly of FIG. 5A in the shipping position and the tower assembly.
Figure 7B:
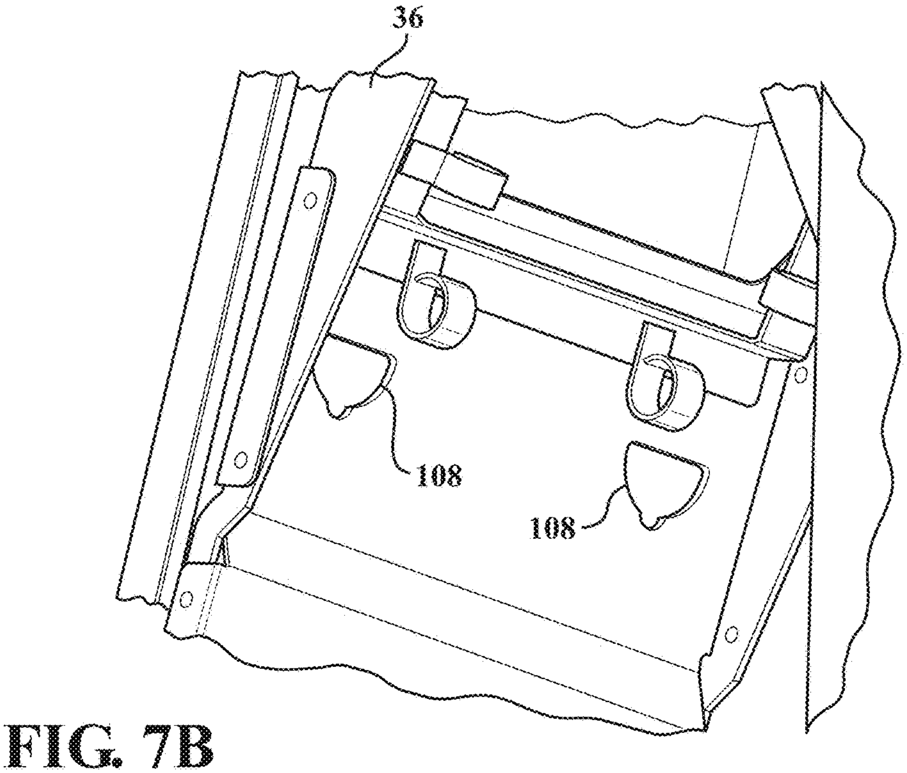
FIG. 7B is a third partial perspective view of the monitor assembly of FIG. 5A.
Figure 7D:
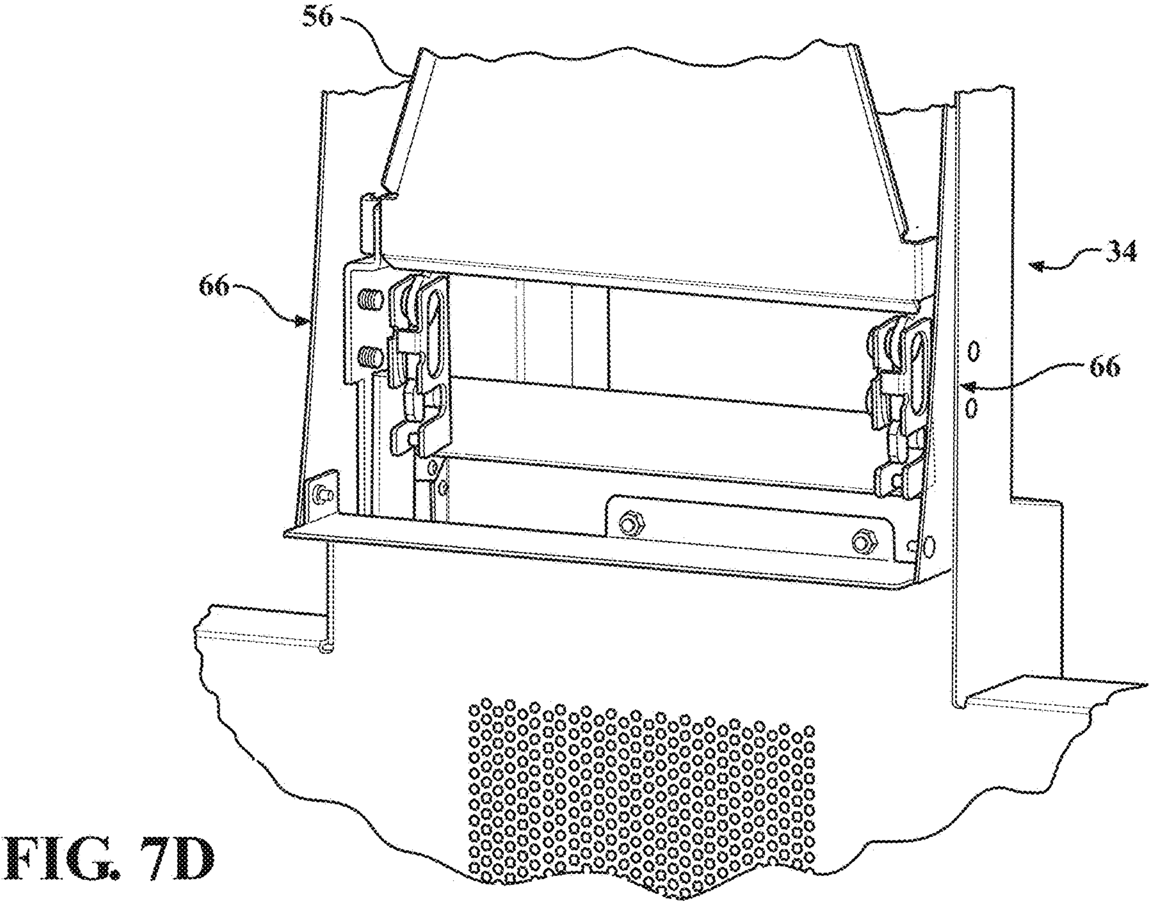
FIG. 7D is a partial perspective view of the tower assembly of FIG. 6A.
Figure 7C:
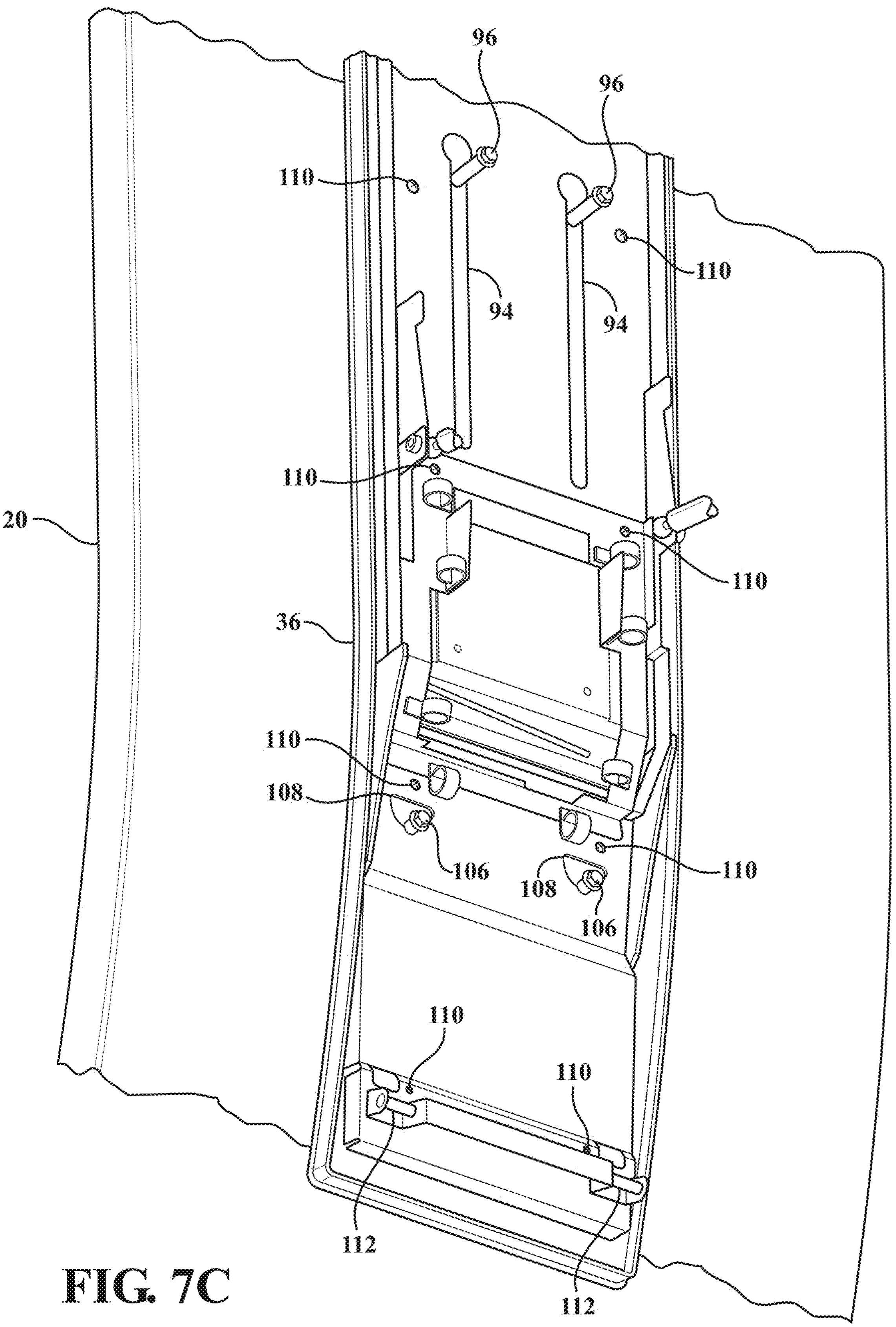
FIG. 7C is a fourth partial perspective view of the monitor assembly of FIG. 5A.

With specific reference to FIGS. 7A-7D, the rear of the monitor assembly 20 is shown with the monitor assembly 20 in the intermediate position. As discussed above, from the shipping position, the second end 56B of the lower brace 56 is disconnected from the rear of the at least one monitor 22, 22A, 22B, for example, through the removal of fasteners. Removal of the lower brace 56 results in the extension of the gas springs 50 and the rotation of the at least one monitor 22, 22A, 22B slightly away from the tower assembly (see FIG. 5B). The user/installer may then slide the at least one monitor 22, 22A, 22B upward along the chassis 36 and insert the lower pins 106 into the mounting points 108. As shown in FIG. 7C, once the lower pins 106 are within the mounting points 108, the at least one monitor 22, 22A, 22B may be fixedly connected to the chassis 36 via a set of screws 110.

The monitor assembly 20 can now be closed by pushing downward on the monitor assembly 20. Two clevis pins 112 on the bottom of the monitor assembly 20 may be received with the latch 66 (FIG. 7D) to controllably lock the monitor assembly 20.

Figure 7E:
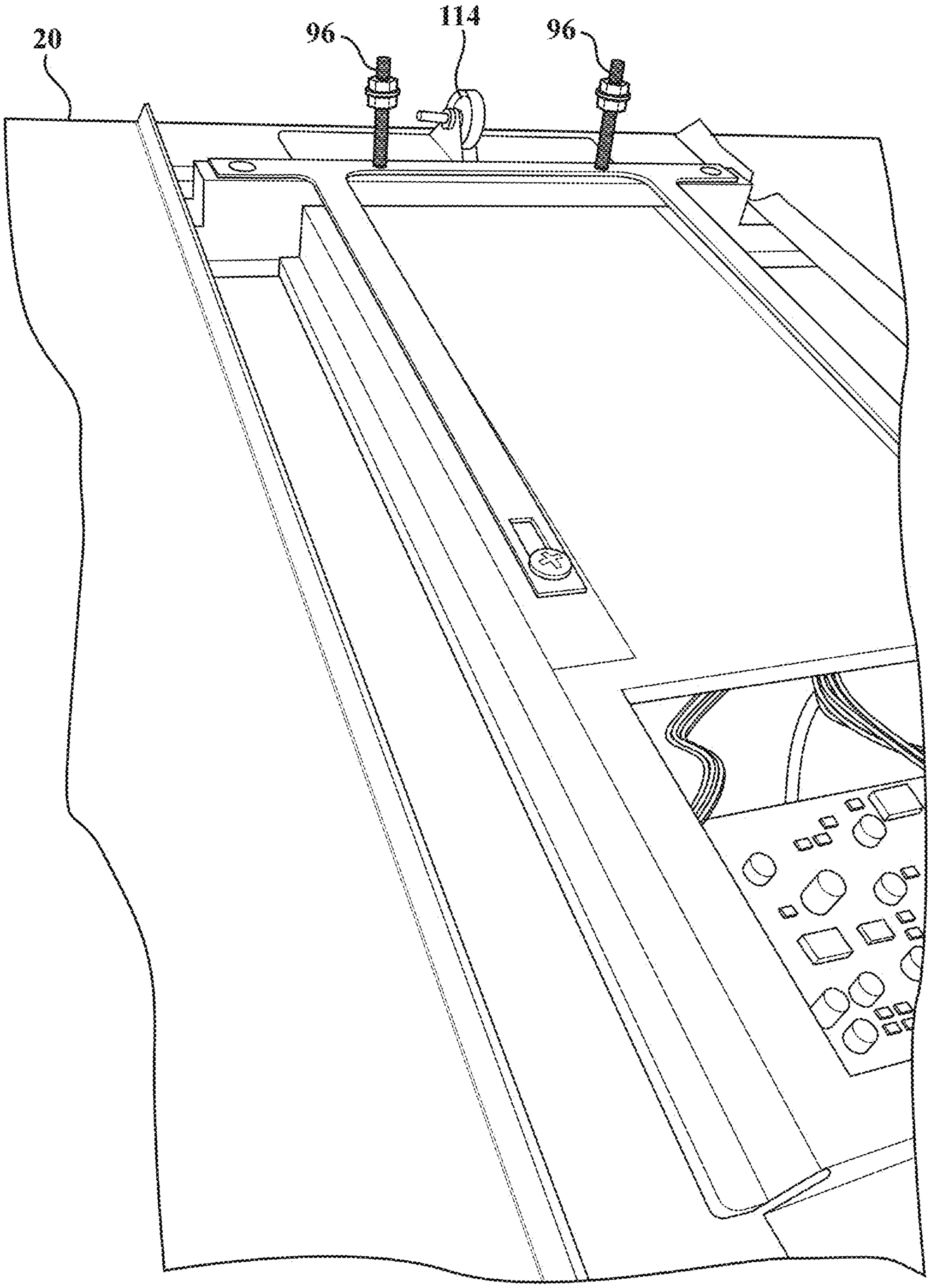
FIG. 7E is a partial perspective view of the tower assembly of FIG. 6A, according to an alternative embodiment.

With reference to FIG. 7E, in a further embodiment, a wheel 114 located on the rear of the at least one monitor 22, 22A, 22B may be provided to assist in the movement of the at least one monitor 22, 22A, 22B along the chassis 36.

All remaining electrical harness connections may be made and the monitor assembly 20 may be closed and latched shut. The steps of the assembly process have been presented or described above in a particular potential or possible order. However, it should be noted that to the extent possible, the steps could be performed in a different order.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A gaming machine cabinet having a shipping configuration and an assembled configuration, comprising:

a base cabinet having an upper end, a bottom end, and a front side;

a tower assembly being coupled to the upper end of the base cabinet and extending upward therefrom;

a monitor assembly moveably coupled to the tower assembly, the monitor assembly being moveable between a shipping position and a closed position;

a biasing mechanism rotatably coupled between the tower assembly and the monitor assembly, wherein the biasing mechanism includes a pair of gas springs; and, a removable brace device being connected to the tower assembly and the monitor assembly when the removable brace is in a shipping state and the monitor assembly is in the shipping position, wherein the gaming machine cabinet is in the shipping configuration when the monitor assembly is in the shipping position and the removable brace device is in the shipping state, wherein the gaming machine cabinet is in the assembled configuration when the removable brace device is removed and the monitor assembly is in the closed position, wherein the monitor assembly is moveable from the shipping position when the removable brace device is removed.

2. The gaming machine cabinet, as set forth in claim 1, wherein the monitor assembly is moveable between the shipping position and an intermediate position and between the intermediate position and the closed position when the removable brace device is removed.

3. The gaming machine cabinet, as set forth in claim 1, wherein the removable brace device includes a lower brace and at least one upper brace, wherein a first end of the lower brace is connected to the upper tower and a second end of the lower brace is connected to the monitor assembly when the removable brace device is in the shipping state, wherein the tower assembly includes a rear tower frame and the at least one upper brace is connected between the rear tower frame and the upper tower when the monitor assembly is in the shipping position.

4. The gaming machine cabinet, as set forth in claim 3, wherein the lower brace and the at least one upper brace are configured to be stored within the tower assembly when the gaming machine cabinet is in the assembled configuration.

5. The gaming machine cabinet, as set forth in claim 1, wherein the pair of gas springs are configured to provide assistance as the monitor assembly is moved between an intermediate position and the closed position.

6. The gaming machine cabinet, as set forth in claim 1, wherein the monitor assembly includes a coupling mechanism configured to rotatably couple the monitor assembly to the tower assembly when the monitor assembly is in an intermediate position.

7. The gaming machine cabinet, as set forth in claim 6, wherein the monitor assembly is configured to rotate about the coupling mechanism from the intermediate position to the closed position.

8. The gaming machine cabinet, as set forth in claim 7, further comprising a latching mechanism moveable between an unlocked position and a locked position and configured to maintain the monitor assembly in the closed position when in the locked position.

9. The gaming machine cabinet, as set forth in claim 1, the tower assembly including a lower tower and an upper tower, the lower tower being coupled to the upper end of the base cabinet and extending upward therefrom, the upper tower being rotatably coupled to the lower tower and being movable between a first tower position and a second tower position, wherein the upper tower is in the first tower position when the monitor assembly is in the shipping position and in the second tower position when the monitor assembly is in an intermediate and the closed positions.

10. The gaming machine cabinet, as set forth in claim 9, the lower tower having a lower tower upper end and a lower tower bottom end, the lower tower bottom end being coupled to the upper end of the base cabinet, the lower tower extending from the upper end of the base, the upper tower having upper tower upper end and an upper tower bottom end, the upper tower bottom end being rotatably coupled to the lower tower upper end at a pivot point, the upper tower about the pivot point between the first and second positions, wherein the upper tower extends upward from the lower tower when in the second position.

11. The gaming machine cabinet, as set forth in claim 10, wherein the pivot point is defined by a fastener located at each side of the tower assembly.

12. The gaming machine cabinet, as set forth in claim 11, wherein the tower assembly includes a rear tower frame and a dampener coupled to the tear tower frame and the upper tower.

13. The gaming machine cabinet, as set forth in claim 1, wherein the monitor assembly includes a monitor chassis and at least one display device slidably coupled to the monitor chassis.

14. The gaming machine cabinet, as set forth in claim 13, wherein the at least one display device is slidably moveable between a first monitor position and a second monitor position along the monitor chassis.

15. The gaming machine cabinet, as set forth in claim 14, wherein the at least one display device is in the first monitor position when the monitor assembly is in the shipping position and in the second monitor position when the monitor assembly is in an intermediate position and the closed position.

16. The gaming machine cabinet, as set forth in claim 1, wherein the monitor assembly has an associated shipping height when in the shipping position that is taller than a height of the base cabinet.

17. A gaming machine cabinet having a shipping configuration and an assembled configuration, comprising:

a base cabinet having an upper end, a bottom end, and a front side;

a tower assembly being coupled to the upper end of the base cabinet and extending upward therefrom;

a monitor assembly moveably coupled to the tower assembly, the monitor assembly being moveable between a shipping position and a closed position;

a biasing mechanism rotatably coupled between the tower assembly and the monitor assembly; and, a removable brace device being connected to the tower assembly and the monitor assembly when the removable brace is in a shipping state and the monitor assembly is in the shipping position, wherein the gaming machine cabinet is in the shipping configuration when the monitor assembly is in the shipping position and the removable brace device is in the shipping state, wherein the gaming machine cabinet is in the assembled configuration when the removable brace device is removed and the monitor assembly is in the closed position, wherein the monitor assembly is moveable from the shipping position when the removable brace device is removed, wherein the monitor assembly includes a coupling mechanism configured to rotatably couple the monitor assembly to the tower assembly when the monitor assembly is in an intermediate position, wherein the monitor assembly is configured to rotate about the coupling mechanism from the intermediate position to the closed position, wherein the coupling mechanism includes a hook-shaped flange coupled to the monitor assembly and a top edge associated with the tower assembly, the hook-shaped flange configured to slide up and over the top edge of the tower assembly as the monitor assembly is moved from the shipping position to the intermediate position.

18. An assembly process for a gaming machine cabinet having a shipping configuration and an assembled configuration and including a base cabinet, a tower assembly, a monitor assembly, a biasing mechanism and a removable brace device, the base cabinet having an upper end, a bottom end, and a front side, the tower assembly being coupled to the upper end of the base cabinet and extending upward therefrom, the monitor assembly moveably coupled to the tower assembly, the monitor assembly being moveable between a shipping position and a closed position, the biasing mechanism rotatably coupled between the tower assembly and the monitor assembly, the removable brace device having a shipping state and a removed state and being connected to the tower assembly and configured to support the monitor assembly when the removable brace is in the shipping state and the monitor assembly is in the shipping position, the gaming machine being in the assembled configuration when the monitor assembly is in the closed position, the monitor assembly being moveable from the shipping position when the removable brace device is in the removed state, comprising the steps of:

with the gaming machine cabinet in the shipping configuration and the monitor assembly in the shipping position, removing the removable brace device from the shipping position;

moving the monitor assembly from the shipping position;

rotating the monitor assembly relative to the tower assembly position to the closed position, wherein the biasing mechanism includes a pair of gas springs configured to provide assistance as the monitor assembly is moved between an intermediate position and the closed position.

19. The assembly process, as set forth in claim 18, wherein the monitor assembly is moveable between the shipping position and an intermediate position and between the intermediate position and the closed position when the removable brace device is removed.

20. The assembly process, as set forth in claim 18, wherein the removable brace device is configured to be stored within the tower assembly when the gaming machine cabinet is in the assembled configuration, the method including the step of storing the removable brace device in the gaming machine cabinet prior to the step of rotation to the monitor assembly to the closed position.

21. The assembly process, as set forth in claim 18, wherein the gaming machine cabinet further includes a coupling mechanism configured to rotatably couple the monitor assembly to the tower assembly when the monitor assembly is in the intermediate position, wherein the monitor assembly is configured to rotate about the coupling mechanism from the intermediate position to the closed position.

22. The assembly process, as set forth in claim 18, further comprising a latching mechanism moveable between an unlocked position and a locked position and configured to maintain the monitor assembly in the closed position when in the locked position.

23. The assembly process, as set forth in claim 18, the tower assembly including a lower tower and an upper tower, the lower tower being coupled to the upper end of the base cabinet and extending upward therefrom, the upper tower being rotatably coupled to the lower tower and being movable between a first tower position and a second tower position, wherein the upper tower is in the first tower position when the monitor assembly is in the shipping position and in the second tower position when the monitor assembly is in the intermediate and closed positions.

24. The assembly process, as set forth in claim 18, the lower tower having a lower tower upper end and a lower tower bottom end, the lower tower bottom end being coupled to the upper end of the base cabinet, the lower tower extending from the upper end of the base, the upper tower having upper tower upper end and an upper tower bottom end, the upper tower bottom end being rotatably coupled to the lower tower upper end at a pivot point, the upper tower about the pivot point between the first and second positions, wherein the upper tower extends upward from the lower tower when in the second position.

25. The assembly process, as set forth in claim 24, wherein the pivot point is defined by a fastener located at each side of the tower assembly.

26. The assembly process, as set forth in claim 18, wherein the monitor assembly includes a monitor chassis and at least one monitor slidably coupled to the monitor chassis.

27. The assembly process, as set forth in claim 26, wherein the at least one monitor is slidably moveable between a first monitor position and a second monitor position along the monitor chassis.

28. The assembly process, as set forth in claim 27, wherein the at least one monitor is in the first monitor position when the monitor assembly is in the shipping position and in the second monitor position when the monitor assembly is in the intermediate and closed positions.

29. The assembly process, as set forth in claim 18, wherein the monitor assembly has an associated shipping height when in the shipping position that is taller than a height of the base cabinet.

* * * * *